(12) United States Patent
Zhao et al.

(10) Patent No.: US 11,232,727 B2
(45) Date of Patent: Jan. 25, 2022

(54) SUBSTRATE, PANEL, DETECTION DEVICE AND ALIGNMENT DETECTION METHOD

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Pucha Zhao, Beijing (CN); Guoqing Zhang, Beijing (CN); Xiaopeng Bai, Beijing (CN); Weifeng Wang, Beijing (CN); Yanbin Dang, Beijing (CN); Zhixin Guo, Beijing (CN); Xingliang Wang, Beijing (CN); Haotian Chen, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

( * ) Notice: Subject to any disclaimer, the term of this patent is extended or adjusted under 35 U.S.C. 154(b) by 126 days.

(21) Appl. No.: 16/466,328

(22) PCT Filed: Oct. 31, 2018

(86) PCT No.: PCT/CN2018/113080
§ 371 (c)(1),
(2) Date: Jun. 4, 2019

(87) PCT Pub. No.: WO2019/085949
PCT Pub. Date: May 9, 2019

(65) Prior Publication Data
US 2019/0311663 A1  Oct. 10, 2019

(30) Foreign Application Priority Data
Nov. 1, 2017 (CN) .......................... 201711058191.7

(51) Int. Cl.
*G09G 3/00* (2006.01)
*H01L 27/32* (2006.01)
(Continued)

(52) U.S. Cl.
CPC ............... *G09G 3/006* (2013.01); *G02F 1/13* (2013.01); *G09G 3/20* (2013.01); *H01L 27/32* (2013.01); *G09G 2330/12* (2013.01)

(58) Field of Classification Search
CPC . G01B 5/00; G01B 7/00; G01B 17/00; G01B 21/00; G01D 3/30; G01D 5/00;
(Continued)

(56) References Cited

U.S. PATENT DOCUMENTS

| 6,531,327 B2 * | 3/2003 | Kanamaru | ......... G01R 1/07342 438/17 |
| 7,646,464 B2 * | 1/2010 | Takenaka | ............... H05K 3/361 349/150 |

(Continued)

FOREIGN PATENT DOCUMENTS

| CN | 101060112 | 10/2007 |
| CN | 101276526 A | 10/2008 |

(Continued)

OTHER PUBLICATIONS

Chinese Office Action dated Apr. 20, 2020 corresponding to Chinese Patent Application No. 201711058191.7; 26 pages.
(Continued)

*Primary Examiner* — Judy Nguyen
*Assistant Examiner* — Joseph O Nyamogo
(74) *Attorney, Agent, or Firm* — Leason Ellis LLP

(57) ABSTRACT

A substrate, a panel, a detection device and an alignment detection method are provided. The substrate includes first signal connection pins arranged in parallel side by side and at least one first alignment detection pin, wherein the at least
(Continued)

one first alignment detection pin is located on at least one side of the first signal connection pins in an arrangement direction of the first signal connection pins, and arranged in parallel with the first signal connection pins.

13 Claims, 15 Drawing Sheets

(51) Int. Cl.
*G02F 1/13* (2006.01)
*G09G 3/20* (2006.01)

(58) Field of Classification Search
CPC ... G01H 9/00; G01H 11/00; G01J 1/00; G01J 3/00; G01J 5/00; G01K 1/00; G01K 3/00; G01K 5/00; G01K 7/00; G01K 11/00; G01K 15/00; G01K 2219/00; G01L 1/00; G01L 5/00; G01L 9/00; G01L 21/00; G01M 3/00; G01M 5/00; G01M 13/00; G01M 15/00; G01N 2291/00; G01N 3/00; G01N 5/00; G01N 9/00; G01N 17/00; G01N 21/00; G01N 22/00; G01N 23/00; G01N 24/00; G01N 25/00; G01N 27/00; G01N 29/00; G01N 31/00; G01N 33/00; G01N 2021/00; G01P 3/00; G01Q 10/00; G01Q 60/00; G01Q 70/00; G01R 1/00; G01R 3/00; G01R 15/00; G01R 19/00; G01R 21/00; G01R 22/00; G01R 27/00; G01R 29/00; G01R 31/00; G01R 33/00; G01R 35/00; G01S 5/00; G01S 13/00; G01V 3/00; G02B 1/00; G02B 6/00; G02B 2006/00; G02F 1/00; G02F 2/00; G02F 2001/00; G02F 2201/00; G02F 2202/00; G02F 2203/00; G02F 1/13; G03G 15/00; G03H 1/00; G03H 2001/00; G03H 2226/00; G04F 5/00; G05D 23/00; G05F 3/00; G06F 1/00; G06F 3/00; G06F 17/00; G06K 7/00; G06K 9/00; G06N 3/00; G06N 10/00; G06N 20/00; G06Q 10/00; G06T 5/00; G06T 7/00; G06T 11/00; G06T 2207/00; G06T 2211/00; G08B 17/00; G08B 21/00; G08B 29/00; G09G 29/00; G09G 3/00; G09G 2300/00; G09G 2320/00; G09G 2330/00; G09G 2360/00; G09G 2370/00; G09G 3/006; G09G 2330/12; G09G 3/20; G11B 9/00; G11C 11/00; G11C 13/00; G11C 29/00; G21K 1/00; G16H 30/00; G16H 50/00; H01B 3/00; H01F 1/00; H01F 17/00; H01F 27/00; H01F 2017/00; H01F 2021/00; H01L 29/00; H01L 21/00; H01L 22/00; H01L 23/00; H01L 24/00; H01L 25/00; H01L 27/00; H01L 31/00; H01L 33/00; H01L 41/00; H01L 43/00; H01L 45/00; H01L 49/00; H01L 51/00; H01L 2223/00; H01L 2224/00; H01L 2225/00; H01L 2251/00; H01L 2924/00; H01L 2933/00; H01L 27/32; H01H 1/00; H01H 2001/00; H01H 2009/00; H01P 1/00; H01P 3/00; H01P 7/00; H01P 11/00; H01Q 1/00; H01Q 3/00; H01Q 9/00; H01Q 15/00; H01Q 17/00; H01Q 21/00; H01Q 25/00; H01R 4/00; H01R 9/00; H01R 12/00; H01S 3/00; H02J 1/00; H02J 3/00; H02J 4/00; H02J 13/00; H02M 1/00; H02M 3/00; H02M 7/00; H02M 2001/00; H02M 2003/00; H02P 5/00; H03B 5/00; H03B 17/00; H03B 19/00; H03D 3/00; H03D 7/00; H03F 1/00; H03F 3/00; H03F 2200/00; H03F 2203/00; H03G 1/00; H03G 3/00; H03H 7/00; H03H 11/00; H03H 19/00; H03J 1/00; H03J 3/00; H03J 2200/00; H03K 3/00; H03K 17/00; H03K 19/00; H03L 7/00; H03L 2207/00; H03M 1/00; H04B 10/00; H04B 17/00; H04L 27/00; H04N 5/00; H04N 7/00; H04R 3/00; H04R 29/00; H04W 24/00; H05K 1/00; H05K 2201/00; H05K 3/00; H05K 7/00
See application file for complete search history.

(56) References Cited

U.S. PATENT DOCUMENTS

| 10,321,559 | B2 | 6/2019 | Meng et al. |
| 2001/0033127 | A1 | 10/2001 | Mizutani et al. |
| 2017/0196080 | A1* | 7/2017 | Meng ............... H05K 1/181 |
| 2017/0365811 | A1* | 12/2017 | Chang ............. H01L 27/3276 |
| 2018/0240384 | A1* | 8/2018 | Li ..................... G09G 3/3648 |

FOREIGN PATENT DOCUMENTS

| CN | 102819126 A | 12/2012 |
| CN | 203705757 U | 7/2014 |
| CN | 105589244 | 5/2016 |
| CN | 105632382 A | 6/2016 |
| CN | 105785607 | 7/2016 |
| CN | 107103869 | 8/2017 |
| JP | 0990398 A | 4/1997 |

OTHER PUBLICATIONS

International Search Report and Written Opinion in corresponding International Patent Application No. PCT/CN2018/113080 dated Jan. 30, 2019 (an English translation attached hereto).

* cited by examiner

SUBSTRATE, PANEL, DETECTION DEVICE AND ALIGNMENT DETECTION METHOD

CROSS-REFERENCE TO RELATED PATENT APPLICATIONS

The present application is a U.S. National Stage Application under 35 U.S.C. § 371 of International Patent Application No. PCT/CN2018/113080, filed Oct. 31, 2018, which claims the priority of the Chinese Patent Application No. 201711058191.7 filed on Nov. 1, 2017, both of which are incorporated herein by reference in their entireties as a part of the present application.

The present application claims the priority of the Chinese Patent Application No. 201711058191.7 filed on Nov. 1, 2017, which is incorporated herein by reference as a part of the present application.

TECHNICAL FIELD

Embodiments of the present disclosure relate to a substrate, a panel, a detection device and an alignment detection method.

BACKGROUND

In the field of producing display panels, a lighting test is usually carried out for a display panel or a substrate (including a mother substrate) during manufacture by a test equipment. In this stage, it can be detected whether the display panel or the substrate during manufacture has broken lines, bad spots or other defects. For example, the above defects may lead to bright spots or dark spots. The lighting test stage is very important for the quality control of the display panel or the substrate.

SUMMARY

At least one embodiment of the present disclosure provides a substrate, comprising: first signal connection pins arranged in parallel side by side; and at least one first alignment detection pin, wherein the at least one first alignment detection pin is located on at least one side of the first signal connection pins in an arrangement direction of the first signal connection pins, and arranged in parallel with the first signal connection pins.

For example, the substrate provided by at least one embodiment of the present disclosure further comprises a working region which is provided with signal lines arranged in parallel to each other; each of the first signal connection pins has a first end and a second end, wherein the first end of each of the first signal connection pins is electrically connected with one of the signal lines.

For example, in the substrate provided by at least one embodiment of the present disclosure, a number of the first alignment detection pins located on each side of the first signal connection pins is 1.

For example, in the substrate provided by at least one embodiment of the present disclosure, the first alignment detection pin is suspended.

For example, in the substrate provided by at least one embodiment of the present disclosure, a conductivity of a material of the first alignment detection pin is greater than a conductivity of a material of the first signal connection pins.

At least one embodiment of the present disclosure further provides a panel, comprising any one of the substrates mentioned above.

At least one embodiment of the present disclosure further provides a detection device, comprising: second signal connection pins arranged in parallel side by side and second alignment detection pins, wherein the second alignment detection pins are located on at least one side of the second signal connection pins in an arrangement direction of the second signal connection pins, and arranged in parallel with the second signal connection pins.

For example, the detection device provided by at least one embodiment of the present disclosure further comprises a test circuit and an alignment circuit, in which each of the second signal connection pins has a first end and a second end, and the test circuit is electrically connected to the first end of each of the second signal connection pins and sends test signals to the second signal connection pins; the alignment circuit is electrically connected to the second alignment detection pins and sends alignment signals to the second alignment detection pins and receives alignment detection result signals from the second alignment detection pins.

For example, in the detection device provided by at least one embodiment of the present disclosure, the second signal connection pins are configured to receive the test signals from the test circuit, and the second alignment detection pins are configured to receive the alignment signals from the alignment circuit and return the alignment detection result signals.

For example, the detection device provided by at least one embodiment of the present disclosure further comprises a control device, which is configured to control turning on and turning off of the test circuit and the alignment circuit, and control the test circuit to send test signals to the second signal connection pins and control the alignment circuit to send alignment signals to the second alignment detection pins.

For example, in the detection device provided by at least one embodiment of the present disclosure, a number of the second alignment detection pins located on each side of the second signal connection pins is 3; in the arrangement direction of the second alignment detection pins on the each side, the second alignment detection pin in the middle is used to receive the alignment signal from the alignment circuit, and accordingly, the second alignment detection pins on both sides of the second alignment detection pin in the middle are used to send the alignment detection result signals.

For example, in the detection device provided by at least one embodiment of the present disclosure, a number of the second alignment detection pins located on each side of the second signal connection pins is 2; two second alignment detection pins close to the second signal connection pins are used to receive the alignment signals from the alignment circuit, and accordingly, two second alignment detection pins away from the second signal connection pins are used to send the alignment detection result signals; or the two second alignment detection pins away from the second signal connection pins are used to receive the alignment signal from the alignment circuit, and accordingly, the two second alignment detection pins close to the second signal connection pins are used to send the alignment detection result signals.

For example, in the detection device provided by at least one embodiment of the present disclosure, a conductivity of a material of the second alignment detection pins is greater than a conductivity of a material of the second signal connection pins.

At least one embodiment of the present disclosure provides an alignment detection method, comprising providing any one of the substrates mentioned above; providing any one of the detection devices mentioned above; contacting the substrate with the detection device to electrically connect the first signal connection pins of the substrate and the second signal connection pins of the detection device one by one, and electrically connect each of the first alignment detection pins with at least one of the second alignment detection pins; and before applying the detection signals to the second signal connection pins, inputting alignment signals to the second alignment detection pins and performing an alignment detection to detect whether the first signal connection pins and the second signal connection pins are aligned accurately.

For example, in the alignment detection method provided by at least one embodiment of the present disclosure, the second alignment detection pins are arranged at an equal spacing and a first spacing is provided between two second alignment detection pins adjacent to each other, and at least one of the first alignment detection pins has a width greater than the first spacing.

For example, in the alignment detection method provided by at least one embodiment of the present disclosure, the first signal connection pins are periodically arranged and a second spacing is provided between two first signal connection pins adjacent to each other; the second signal connection pins are periodically arranged and a third spacing is provided between two second signal connection pins adjacent to each other; the second spacing is equal to the third spacing; in a case that the first signal connection pins and the second signal connection pins are aligned accurately, a fourth spacing is provided between the first alignment detection pin and the second alignment detection pin which are adjacent to each other; and the fourth spacing is less than or equal to the second spacing.

For example, in the alignment detection method provided by at least one embodiment of the present disclosure, a number of the first alignment detection pin on each side of the first signal connection pins in the arrangement direction of the first signal connection pins is 1, and a number of the second alignment detection pins on each side of the second signal connection pins is 3; among the three second alignment detection pins located on each side of the second signal connection pins, the first alignment detection pin is electrically connected to the second alignment detection pin located in the middle; and if there is no feedback of the alignment detection result signal on the second alignment detection pins on both sides of the second alignment detection pin located in the middle, it is determined that the first signal connection pins and the second signal connection pins are aligned accurately; wherein, among the three second alignment detection pins located on each side of the second signal connection pins, the first alignment detection pin is electrically connected to the second alignment detection pin located in the middle, and at the same time is electrically connected to one of the second alignment detection pins located on both sides of the second alignment detection pin located in the middle; if one of the second alignment detection pins on the both sides of the second alignment detection pin located in the middle feeds back the alignment detection result signal, it is determined that the first signal connection pins and the second signal connection pins are aligned inaccurately.

For example, in the alignment detection method provided by at least one embodiment of the present disclosure, a number of the first alignment detection pin on each side of the first signal connection pins in the arrangement direction of the first signal connection pins is 1, and a number of the second alignment detection pins on each side of the second signal connection pins in the arrangement direction of the second signal connection pins is 2; between the two second alignment detection pins located on each side of the second signal connection pins, the second alignment detection pin close to the second signal connection pins is electrically connected to the first alignment detection pin; and if there is no feedback of the alignment detection result signal on the second alignment detection pin away from the second signal connection pins, it is determined that the first signal connection pins and the second signal connection pins are aligned accurately; the two second alignment detection pins on a same side of the second signal connection pins are electrically connected with the first alignment detection pins respectively, and if one of the two second alignment detection pins away from the second signal connection pins feeds back an alignment detection result signal, it is determined that the first signal connection pins and the second signal connection pins are aligned inaccurately; the two second alignment detection pins away from the second signal connection pins are electrically connected to the first alignment detection pins respectively, and if the two second alignment detection pins close to the second signal connection pins have no feedback of the alignment detection result signal, it is determined that the first signal connection pins and the second signal connection pins are aligned accurately; the two second alignment detection pins at a same side of the second signal connection pins are electrically connected with the first alignment detection pins, and if one of the two second alignment detection pins close to the second signal connection pins feeds back the alignment detection result signal, it is determined that the first signal connection pins and the second signal connection pins are aligned inaccurately.

For example, in the alignment detection method provided by at least one embodiment of the present disclosure, the alignment detection result signal is an electrical signal.

For example, in the alignment detection method provided by at least one embodiment of the present disclosure, the electrical signal is a current.

BRIEF DESCRIPTION OF THE DRAWINGS

In order to clearly illustrate the technical solution of embodiments of the present disclosure, the drawings of the embodiments will be briefly described. It is apparent that the described drawings are only related to some embodiments of the present disclosure and thus are not limitative of the present disclosure.

DETAILED DESCRIPTION

Figure 1:
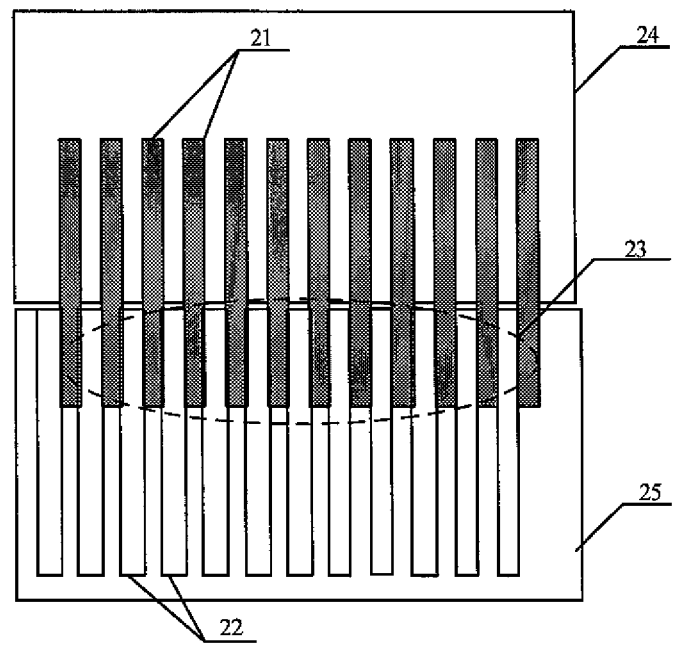
FIG. 1 is a schematic diagram of signal connection between a detection device and a substrate to detect the substrate.

In order to make objects, technical details and advantages of embodiments of the present disclosure clear, the technical solutions of the embodiments of the present disclosure will be described in a clearly and fully understandable way in connection with the related drawings. It is apparent that the described embodiments are just a part but not all of the embodiments of the disclosure. Based on the described embodiments herein, those skilled in the art can obtain, without any inventive work, other embodiment(s) which should be within the scope of the disclosure.

Unless otherwise defined, all the technical and scientific terms used herein have the same meanings as commonly understood by one of ordinary skill in the art to which the present invention pertains. The terms "first," "second," etc., which are used in the description and claims of the present application, are not intended to indicate any sequence, amount or importance, but distinguish various components. The terms "comprises," "comprising," "includes," "including," etc., are intended to specify that the elements or objects stated before these terms encompass the elements or objects listed after these terms as well as equivalents thereof, but do not exclude other elements or objects. The terms "inside," "outside," "on," "under" and the like are only used to indicate relative position relationship, and when the absolute position of an object is described as being changed, the relative position relationship may be changed accordingly.

The sizes of the drawings used in the present disclosure are not drawn strictly according to actual proportions. The number of the first signal connection structure and the number of the second signal connection structure are not limited to the number shown in the drawings. The specific sizes and quantities of each structure can be determined according to actual requirements. The drawings described in the embodiments of the present disclosure are only structurally schematic.

It should be noted that, in the embodiments of the present disclosure, the both sides of the first signal connection pins refer to the both sides of the first signal connection pins in their arrangement direction; each side of the first signal connection pins refers to each side of the first signal connection pins in their arrangement direction; the width and the spacing in the embodiments of the present disclosure refer to the width and the spacing in the arrangement direction of the pins.

In the process of producing a panel such as a display panel, it is usually necessary to test a display substrate (comprising a display mother substrate) included in the display panel or the display panel itself by a detection device to detect whether the display substrate or the display panel has broken wires, bad spots or the like, for example, the defects leading to bright spots or dark spots.

FIG. 1 is a schematic diagram of signal connection between a detection device and a substrate to detect the substrate. As illustrated in FIG. 1, second signal connection pins 21 are arranged in the detection device 24 and first signal connection pins 22 are arranged on the substrate 25. Signal lines (not shown in the FIG. 1) are further arranged on the substrate 25 to control the working state of each working unit of the substrate 25. The first signal connection pins 22 are electrically connected to the signal lines on the substrate one by one. In the detection process, the second signal connection pins 21 are electrically connected to the first signal connecting pins 22 one by one. After the electrical connection, the second signal connection pins 21 receive the electrical signals from the detection device 24, and the electrical signals are transmitted to the signal lines on the substrate 25 by the first signal connection pins 22 on the substrate 25. For example, the substrate 25 may be located in the panel, wherein the panel may further a backlight, and once the backlight is lighted, the panel is lighted. Alternatively, the panel does not need a backlight, for example, an external light source located outside the panel is provided, or each working unit in the panel is equipped with a light-emitting element, and the signal lines control the light-emitting state of the emitting elements. The light-emitting state of the panel can be detected by controlling the panel by the signal lines on the substrate, for example, for detecting whether there are bright spots or dark spots and thus detecting whether the signal lines are working poorly.

However, in the process of detecting, in a case that second signal connection pins 21 and first signal connection pins 22 are electrically connected one by one, the problem of inaccurate alignment between the second signal connection pins 21 and the first signal connection pins 22 is easy to occur. As illustrated in the signal connection area 23 in FIG. 1, the inaccurate alignment may result in short circuit of adjacent signal lines electrically connected by the second signal connection pins 21. At this time, in a case that the detection signal is input from the detection device, it is easy to damage the signal line and other working devices on the substrate 25. Especially for the substrate or the panel with a small size, the widths of the signal lines, the second signal connection pins 21 and the first signal connection pins 22 are small, and the spacing between adjacent second signal connection pins 21 and the spacing between adjacent first signal connection pins 22 are small. For example, the widths of the signal lines, the first signal connection pins and the second signal connection pins can reach micron level, and the spacing between the adjacent first signal connection pins and the spacing between the adjacent second signal connection pins can also reach micron level, such as about 60 microns to 80 microns, which is more likely to cause the problem of short circuit due to the above mentioned inaccurate alignment.

At least one embodiment of the present disclosure provides a substrate, comprising: first signal connection pins arranged in parallel side by side and at least one first alignment detection pin. The at least one first alignment detection pin is located on at least one side of the first signal connection pins in an arrangement direction of the first signal connection pins, and arranged in parallel with the first signal connection pins.

At least one embodiment of the present disclosure further provides a panel, comprising any one of the substrates mentioned above.

At least one embodiment of the present disclosure further provides a detection device, comprising: second signal connection pins arranged in parallel side by side; and second alignment detection pins, located on at least one side of the second signal connection pins in an arrangement direction of the second signal connection pins, and arranged in parallel with the second signal connection pins.

At least one embodiment of the present disclosure provides an alignment detection method, comprising: providing any one of the substrates mentioned above; providing any one of the detection devices mentioned above; contacting the substrate with the detection device to electrically connect the first signal connection pins of the substrate and the second signal connection pins of the detection device one by one, and electrically connecting each of the first alignment detection pins with at least one of the second alignment detection pin; and before applying the detection signals to the second signal connection pins, inputting alignment signals to the second alignment detection pins and performing an alignment detection to detect whether the first signal connection pins and the second signal connection pins are aligned accurately.

Figure 2A:
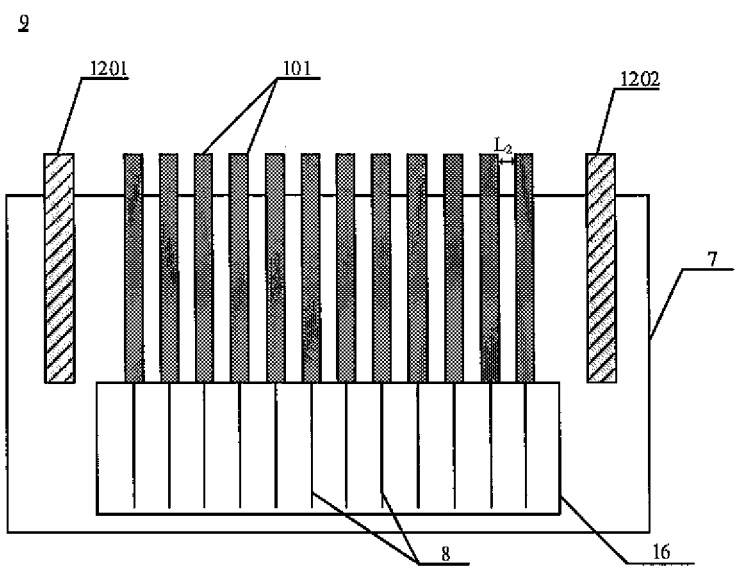
FIG. 2A is a schematic diagram of a planar structure of a substrate provided by an embodiment of the present disclosure.
Figure 2B:
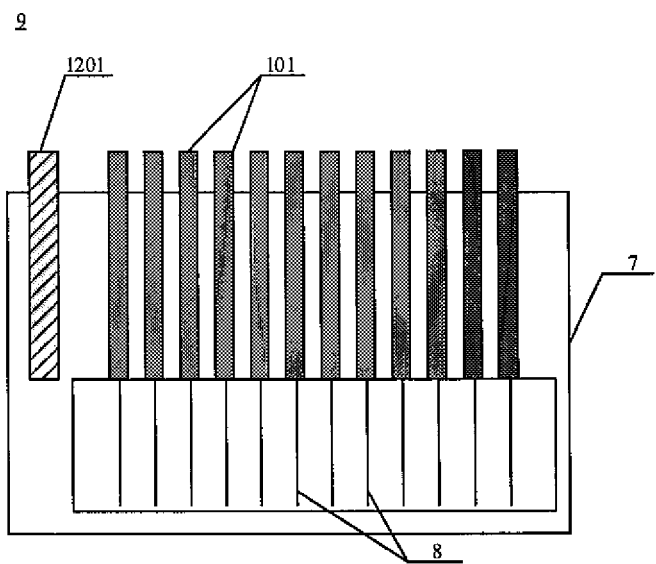
FIG. 2B is a schematic diagram of a planar structure of another substrate provided by an embodiment of the present disclosure.

For example, FIG. 2A is a schematic diagram of a planar structure of a substrate provided by an embodiment of the present disclosure, and FIG. 2B is a schematic diagram of a planar structure of another substrate provided by an embodiment of the present disclosure.

At least one embodiment of the present disclosure provides a substrate, comprising: first signal connection pins arranged in parallel side by side and at least one first alignment detection pin. The at least one first alignment detection pin is located on at least one side of the first signal connection pins in an arrangement direction of the first signal connection pins, and arranged in parallel with the first signal connection pins.

Exemplarily, as illustrated in FIG. 2A, the substrate 9 comprises a base substrate 7, first signal connection pins 101 arranged in parallel side by side, a first alignment detection pin 1201, and a first alignment detection pin 1202 arranged on the base substrate 7. For example, first signal connection pins 101 are arranged at an equal spacing. For example, the spacing between two adjacent first signal connection pins 101 is a second spacing L2. The first alignment detection pin 1201 and the first alignment detection pin 1202 are located on both sides of first signal connection pins 101 in an arrangement direction of first signal connection pins 101, respectively. The first alignment detection pin 1201 and the first alignment detection pin 1202 are arranged in parallel with first signal connection pins 101. Each of the first signal connection pins 101 has a first end and a second end opposite to the first end. The first end is used for signal connection with the working region 16 of the substrate 9. The second end is used for signal connection with the second signal connection pins of the detection device in the detection process to receive the detection signal from the detection device and to detect the operation of the substrate 9. Before using the first alignment detection pin 1201 and the first alignment detection pin 1202 to detect the operation of the substrate 9, alignment between the first signal connection pins 101 and the second signal connection pins of the detection device is detected, to determine whether the alignment is accurate, thereby preventing the problem of short circuit caused by inaccurate alignment, and avoiding damage to the signal lines and other devices on the substrate.

For example, in the working region 16 of the substrate 9, there are signal lines 8 arranged parallel to each other. The first ends of the first signal connection pins 101 are electrically connected to the signal lines 8 in the working region 16. For example, the first end of each of the first signal connection pins 101 may be electrically connected to a signal line 8, and the first signal connection pins 101 may be pins of the signal lines 8. For example, the first signal connection pins 101 and the signal lines 8 are integrally formed. The integrally formed means that the first signal connection pins 101 and the signal lines 8 are of the same material and there is no seam between them. For example, the signal lines 8 are gate lines, data lines, touch lines or touch electrodes and so on. The first signal connection pins 101 receive electrical signals from the detection device, and the electrical signals are transmitted to the signal lines 8 on the substrate 9 to detect whether the signal lines 8 are working properly.

For example, a number of the first alignment detection pins on each side of the first signal connection pins 101 is at least 1. For example, the number of the first alignment detection pins on each side of the first signal connection pins 101 is 1, which makes the structure of the substrate 9 simple, and the number of the first alignment detection pins is as small as possible, which reduces the area occupied by the first alignment detection pins around the substrate 9, and facilitates the devices including the substrate (such as display devices) to have a narrow frame.

For example, the first alignment detection pins 1201/1202 are suspended. Suspended means that the first alignment detection pins 1201/1202 are not electrically connected with any other devices in a non-working state (for example, a state of no alignment detection). In the process of alignment detection, as described below, in a case that the first signal connection pins 101 and the second signal connection pins of the detection device are aligned inaccurately, the first alignment detection pins 1201/1202 are used for electrically connecting the adjacent second alignment detection pins of the detection device, and forming a circuit with the adjacent second alignment detection pins to enable the adjacent second alignment detection pins to feedback an electrical signal which can be detected and used as a signal of inaccurate alignment.

In an example of the present disclosure, for example, as illustrated in FIG. 2A, the first alignment detection pin may be provided on both sides of the first signal connection pins 101. For example, the first alignment detection pin is arranged on both sides of the first signal connection pins 101. In another example of the present disclosure, as illustrated in FIG. 2B, the first alignment detection pin 1201 is only arranged on one side of the first signal connection pins 101, and the first alignment detection pin is not arranged on the other side of the first signal connection pins 101. Arranging the first alignment detection pins on one side or both sides of the first signal connection pins 101 and the number of the first alignment detection pins can be determined according to the arrangement of the alignment detection pins of the detection device matching with the first alignment detection pins of the substrate, which are not limited herein.

For example, a conductivity of a material of the first alignment detection pin 1201/1202 is higher than a conductivity of a material of the first signal connection pins 101. The high conductivity of the material of the first alignment detection pins 1201/1202 can make the circuit formed to have a small resistance in a case that the first signal connection pins 101 and the second signal connection pins of the detection device are aligned inaccurately in the process of alignment detection, and the feedback electrical signal can be detected more easily, so that the problem of inaccurate alignment can be judged more sensitively. For example, the material of the first signal connection pins 101 and the first alignment detection pins 1201/1202 can be a metal material, for example, copper, aluminum, copper alloys or aluminum alloys. For example, the material of the first signal connection pins 101 can be aluminum or titanium, and the first alignment detection pins 1201/1202 can be formed of copper, which has a higher conductivity than aluminum and titanium. Of course, in some examples, the material of the first alignment detection pins 1201/1202 and the material of the first signal connection pins 101 can be the same. The material of the first signal connection pins 101 and the material of the first alignment detection pins 1201/ 1202 are not limited to the above, which are not limited in the embodiments of the present disclosure.

For example, the width of the first signal connection pins 101 is small and the spacing between the adjacent first signal connection pins is in a micron level, for example, about 60 to 80 μm, to be suitable for substrates with a smaller size.

At least one embodiment of the present disclosure further provides a panel comprising any one of the substrates mentioned above. The panel provided by the embodiment of the present disclosure, for example, is a light-emitting panel or a display panel, etc. In a case that the detection device is used to detect the working state of the panel (for example, whether the panel is not working properly), before detecting the working state, the panel can cooperate with the detection device to detect the first signal connection pins on the panel and the second signal connection pins of the detection device in order to detect whether the first signal connection pins and the second signal connection pins are aligned accurately. As such, the problem of short circuit caused by the inaccurate alignment of the first signal connection pins and the second signal connection pins can be prevented, and thus the damage to the signal lines and other devices on the substrate can be avoided.

For example, the panel is a display panel. For example, the display panel is a liquid crystal display panel or an organic light-emitting display panel. For example, in a case that the panel is the liquid crystal display panel, it further comprises a backlight.

At least one embodiment of the present disclosure further provides a detection device, comprising: second signal connection pins arranged in parallel side by side and second alignment detection pins. The second alignment detection pins are located on at least one side of the second signal connection pins in an arrangement direction of the second signal connection pins, and arranged in parallel with the second signal connection pins.

Before detecting the working state of the substrate, the detection device provided in the embodiment of the present disclosure can cooperate with the substrate to detect whether the first signal connection pins of the substrate and the second signal connection pins of the detection device are aligned accurately. As such, the problem of short circuit caused by the inaccurate alignment of the first signal connection pins and the second signal connection pins can be prevented, and thus the damage to the signal lines and other devices on the substrate can be avoided.

Figure 3A:
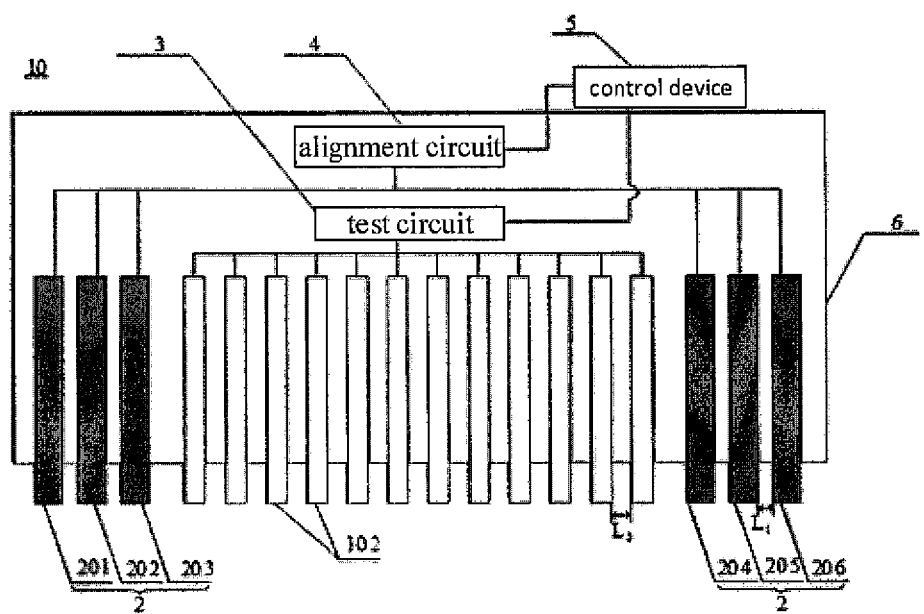
FIG. 3A is a schematic diagram of a planar structure of a detection device provided by an embodiment of the present disclosure.
Figure 3B:
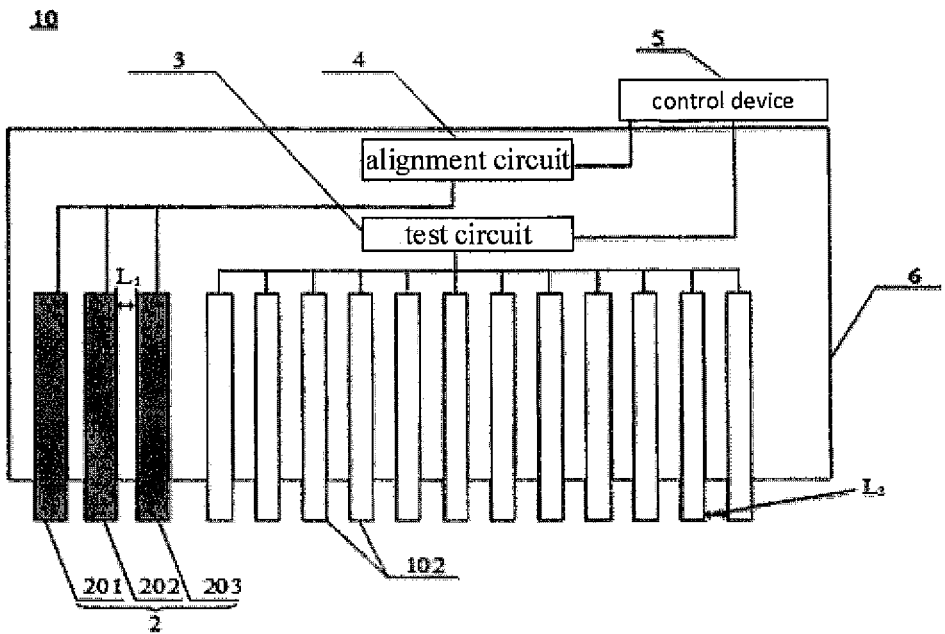
FIG. 3B is a schematic diagram of a planar structure of another detection device provided by an embodiment of the present disclosure.
Figure 3C:
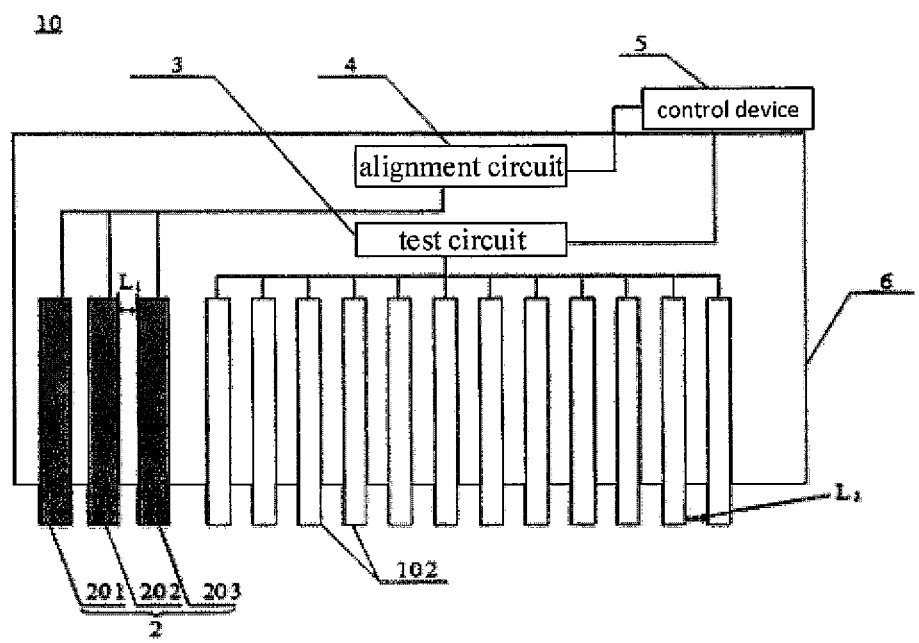
FIG. 3C is a schematic diagram of a planar structure of another detection device provided by an embodiment of the present disclosure.

FIG. 3A is a schematic diagram of a planar structure of a detection device provided by an embodiment of the present disclosure; FIG. 3B is a schematic diagram of a planar structure of another detection device provided by an embodiment of the present disclosure; and FIG. 3C is a schematic diagram of a planar structure of another detection device provided by an embodiment of the present disclosure.

Exemplarily, as illustrated in FIG. 3A, the detection device 10 comprises second signal connection pins 102 and second alignment detection pins 2 arranged in parallel side by side. For example, second signal connection pins 102 can be arranged at an equal spacing, and the spacing between two adjacent second signal connection pins 102 is a third spacing L3. For example, second alignment detection pins 2 are located on both sides of the second signal connection pins 102 in an arrangement direction of the second signal connection pins 102. For example, the second alignment detection pins 201/202/203 are located on one side of the second signal connection pins 102 in the arrangement direction of the second signal connection pins 102, and the second alignment detection pins 204/205/206 are located on the other side of the second signal connection pins 102 in the arrangement direction of the second signal connection pins 102. Second alignment detection pins 2 are arranged in parallel with second signal connection pins 102. Each of the second signal connection pins 102 has a first end and a second end opposite to the first end. The first ends are used to receive a detection signal from the detection device, and the second ends are used to connect the first signal connection pins of the substrate to detect the working state of the substrate. Before detecting the working state of the substrate, the second alignment detection pin 2 is used to detect whether the first signal connection pins of the substrate and the second signal connection pins 102 are aligned accurately. As such, the problem of short circuit caused by the inaccurate alignment of the first signal connection pins and the second signal connection pins 102 can be prevented, and thus the damage to the signal lines and other devices on the substrate can be avoided.

For example, the detection device 10 further comprises a test circuit 3 and an alignment circuit 4. The test circuit 3 is electrically connected to the first end of the second signal connection pin 102 and sends test signals such as electrical signals to the second signal connection pin 102. For detecting the working state of the substrate, the second ends of the second signal connection pins 102 are connected with the first signal connection pins of the substrate. For example, the second signal connection pins 102 receive the test signals from the detection device 10 (that is, the test signals transmitted by the test circuit 3), and transmit the test signal to the substrate to detect the operation of the substrate. For example, the test circuit 3 and the alignment circuit 4 are arranged on a printed circuit substrate 6.

The alignment circuit 4 is electrically connected with the second alignment detection pins 2 and can send an alignment signal to the second alignment detection pins 2. Before detecting the working state of the substrate, the alignment circuit 4 sends the alignment signals, such as electrical signals, to the second alignment detection pins 2, and the second alignment detection pins 2 receive the alignment signals from the detection device 10 to detect whether the second signal connection pins 102 are aligned accurately with the first signal connection pins of the substrate.

For example, a number of the second alignment detection pins on each side of the second signal connection pins 102 is 3. For example, in the arrangement direction of the second alignment detection pins 102 on the each side, the second alignment detection pin 202/205 in the middle is used to receive the alignment signals from the alignment circuit.

Accordingly, the second alignment detection pins 201/203/ 204/206 on both sides of the second alignment detection pins 202/205 in the middle is used to send the alignment detection result signal.

For example, in the process of alignment detection, the alignment circuit 4 sends a detection signal to the second alignment detection pin 202/205 located in the middle. In a case that the second signal connection pins 102 are aligned accurately with the first signal connection pins of the substrate, the second alignment detection pins 202/205, for example, are electrically connected to the first alignment detection pins of the substrate and no circuit is formed, and thus the second alignment detection pins 201/203/204/206 do not feedback the electrical signals. In a case that the second signal connection pins 102 are aligned inaccurately with the first signal connection pins of the substrate (for example, the substrate shifts to the left in FIG. 3A), the adjacent second alignment detection pins 2, for example the second alignment detection pin 201 and the second alignment detection pin 202, or the second alignment detection pin 204 and the second alignment detection pin 205, are electrically connected by the first alignment detection pins of the substrate and form a circuit together with the first alignment detection pins of the substrate to make the second alignment detection pin 201 and the second alignment detection pin 204 feedback electrical signals, that is, the second alignment detection pin 201 and the second alignment detection pin 204 return the alignment detection result signals. The electrical signals can be detected, so the electrical signals can be used as the alignment detection result signals, which indicates that the alignment is inaccurate. At this time, the alignment circuit 4 can receive the alignment detection result signals from the second alignment detection pin 201, and the tester can be guided to move the substrate towards the right for accurate alignment. For example, the alignment circuit 4 comprises a galvanometer in series with the second alignment detection pins 201 to detect the alignment detection result signals. That is, if the galvanometer detects the current, the alignment detected is inaccurate; if the galvanometer does not detect the current, the alignment detected is accurate. For example, in a case that the substrate shifts to the right in FIG. 3A, the second alignment detection pin 203 and the second alignment detection pin 202, or the second alignment detection pin 206 and the second alignment detection pin 205 will be electrically connected by the first alignment detection pins of the substrate and form a circuit with the first alignment detection pins of the substrate, so that the second alignment detection pin 203 and/or the second alignment detection pin 206 can feedback the electrical signals. That is, the second alignment detection pin 203 and the second alignment detection pin 206 can return the alignment detection result signal, and the tester can be guided to move the substrate towards the left for accurate alignment.

For example, the detection device 10 further comprises a control device 5, in which the control device 5 is configured to control turning on and turning off of the test circuit 3 and the alignment circuit 4, and to control the test circuit 3 to send test signals such as electrical signals to the second signal connection pins 102, and control the alignment circuit 4 to send alignment signals such as electrical signals to the second alignment detection pins 2. For example, the control device 5 can be a control circuit, a programmable controller, a single chip computer, a microprocessor, etc. For a specific type and a structure of the control device 5, those skilled in the art may refer to conventional technology for selection.

For example, second alignment detection pins 2 may be located only on one side of the second signal connection pins 102 in the arrangement direction of the second signal connection pins 102. For example, as illustrated in FIG. 3B, the second alignment detection pins 201/202/203 are located on one side of second signal connection pins 102. The other structures and working principle of the detection device 10 shown in FIG. 3B are the same as those shown in FIG. 3A. Please refer to the above description.

For another example, as illustrated in FIG. 3C, the difference between the present example and the example shown in FIG. 3A is that the number of second alignment detection pins on each side of the second signal connection pins 102 is 2. For example, the two second alignment detection pins 202/203 close to the second signal connection pins 102 are used to receive alignment signals from the alignment circuit, and accordingly, the two second alignment detection pins 201/204 away from the second signal connection pins 102 are used to send the alignment detection result signals. The working principle is similar to that of the example shown in FIG. 3A. For example, the alignment circuit 4 includes a galvanometer in series with the second alignment detection pin 201 and a galvanometer in series with the second alignment detection pin 204, which are used to detect the current on the second alignment detection pins 201 and 204 respectively, and to determine the result of the alignment detection. For example, in the process of alignment detection, the second alignment detection pins 202/203 close to the second signal connection pin 1022 receive the detection signal from the alignment circuit 4. In a case that the second signal connection pins 102 are aligned accurately with the first signal connection pin of the substrate, for example, only the second alignment detection pins 202/203 are electrically connected to the alignment detection pins of the substrate, and thus no circuit is formed, and the second alignment detection pins 201/204 does not feedback the electrical signals. For example, if both the galvanometer in series with the second alignment detection pin 201 and the galvanometer in series with the second alignment detection pin 204 do not detect a current, the alignment detection result is accurate alignment. In a case that the second signal connection pin 102 is aligned inaccurately with the first signal connection pin of the substrate, for example the first signal connection pin 101 shifts to the left in FIG. 3C, the adjacent second alignment detection pins 201/202 are electrically connected by the first alignment detection pins of the substrate and forms a circuit with the first alignment detection pins of the substrate, so that the second alignment detection pin 201 feeds back the electrical signals, that is, the second alignment detection pin 201 returns the alignment detection result signals, and the electrical signals can be detected. For example, if the galvanometer connected in series with the second alignment detection pin 201 detects a current, the alignment detection result is inaccurate alignment, and the tester can be guided to move the substrate towards the right for accurate alignment. For example, in a case that the first signal connection pins 101 shift to the right in FIG. 3C, the adjacent second alignment detection pins 203/204 can be electrically connected by the first alignment detection pins of the substrate and form a circuit with the first alignment detection pins of the substrate, so that the second alignment detection pin 204 feeds back electrical signals, that is, the second alignment detection pin 204 returns the alignment detection result signals. The electrical signals can be detected. For example, if the galvanometer connected in series with the second alignment detection pin 204 detects the current, the result of the alignment detection is inaccurate alignment, and the tester can be guided to move the substrate towards the left for accurate alignment.

For example, the principle of alignment detection of the detection device shown in FIG. 3C can also be as follows: two second alignment detection pins 201/204 away from the second signal connection pins 102 are used to receive the alignment signals from the alignment circuit, and accordingly, two second alignment detection pins 202/203 close to the second signal connection pins 102 are used to send the alignment detection result signals. For example, the alignment circuit 4 comprises a galvanometer in series with the second alignment detection pin 202 and a galvanometer in series with the second alignment detection pin 203. For example, in the process of alignment detection, two second alignment detection pins 201/204 away from the second signal connection pins 102 receive the detection signals from the alignment circuit 4. In a case that the second signal connection pins 102 are accurately aligned with the first signal connection pins of the substrate, for example, only the second alignment detection pins 201/204 are electrically connected to the first alignment detection pins of the substrate, and thus no circuit is formed, and the two second alignment detection pins 202/203 close to the second signal connection pins 102 do not feedback the electrical signals. For example, if the galvanometer in series with the second alignment detection pin 202 and the galvanometer in series with the second alignment detection pin 203 do not detect the current, the alignment detection result is accurate alignment. In a case that the second signal connection pins 102 are aligned inaccurately with the first signal connection pins of the substrate, for example, the first signal connection pins 101 shift to the left in FIG. 3C, the adjacent second alignment detection pins 203/204 are electrically connected by the first alignment detection pins of the substrate, and a circuit is formed with the first alignment detection pins of the substrate, so that the second alignment detection pin 203 feeds back the electrical signals. That is, the second alignment detection pin 203 returns the alignment detection result signals. The electrical signals can be detected. For example, if the galvanometer connected in series with the second alignment detection pin 203 detects a current, the result of the alignment detection is inaccurate alignment, and the tester can be guided to move the substrate towards the right for accurate alignment. For example, in a case that the first signal connection pins 101 shift to the right in FIG. 3C, the adjacent second alignment detection pins 201/202 are electrically connected by the first alignment detection pins of the substrate, and forms a circuit with the first alignment detection pins of the substrate, thus enabling the second alignment detection pin 202 to feedback the electrical signals, that is, the second alignment detection pin 202 returns the alignment detection result signals. The electrical signals can be detected, for example, the galvanometer connected in series with the second alignment detection pin 202 detects a current, indicating that the alignment detection result is inaccurate alignment, and the tester can be guided to move the substrate towards the left for accurate alignment.

For example, a conductivity of a material of the second alignment detection pins 2 is higher than a conductivity of a material of the second signal connection pins 102. The high conductivity of the material of the second alignment detection pins 2 can make the circuit formed to have a small resistance in a case that the second signal connection pins 102 and the first signal connection pins of the substrate are aligned inaccurately in the process of alignment detection, and the feedback electrical signal can be detected more easily, so that the problem of inaccurate alignment can be judged more sensitively. For example, the material of the second signal connection pins 102 and the second alignment detection pins 2 can be a metal material, for example, copper, aluminum, copper alloys or aluminum alloys. For example, the material of the second signal connection pins 102 can be aluminum or titanium, and the second alignment detection pins 2 can be formed of a metal with a higher conductivity, such as copper, than that of aluminum and titanium. Of course, in some examples, the material of the second alignment detection pins 2 can be the same as the second signal connection pins 102. The material of the second signal connection pins 102 and the material of the second alignment detection pins 2 are not limited to the above description, which is not limited in the embodiments of the present disclosure.

At least one embodiment of the present disclosure further provides an alignment detection method. The method comprises: providing any one of the substrates mentioned above; providing any one of the detection devices a mentioned above; contacting the substrate with the detection device to electrically connect the first signal connection pins of the substrate and the second signal connection pins of the detection device one by one, and electrically connecting each of the first alignment detection pins with at least one of the second alignment detection pin; and before applying the detection signals to the second signal connection pins, inputting alignment signals to the second alignment detection pins and performing an alignment detection to detect whether the first signal connection pins and the second signal connection pins are aligned accurately.

The alignment detection method provided by the embodiment of the present disclosure can perform alignment detection on the first signal connection pins 101 and the second signal connection pins of the detection device before detecting the operation of the substrate, to detect whether the first alignment detection pins and the second signal connection pins are aligned accurately, thereby preventing the problem of short circuit caused by inaccurate alignment, and avoiding damage to the signal lines and other devices on the substrate.

Figure 4A:
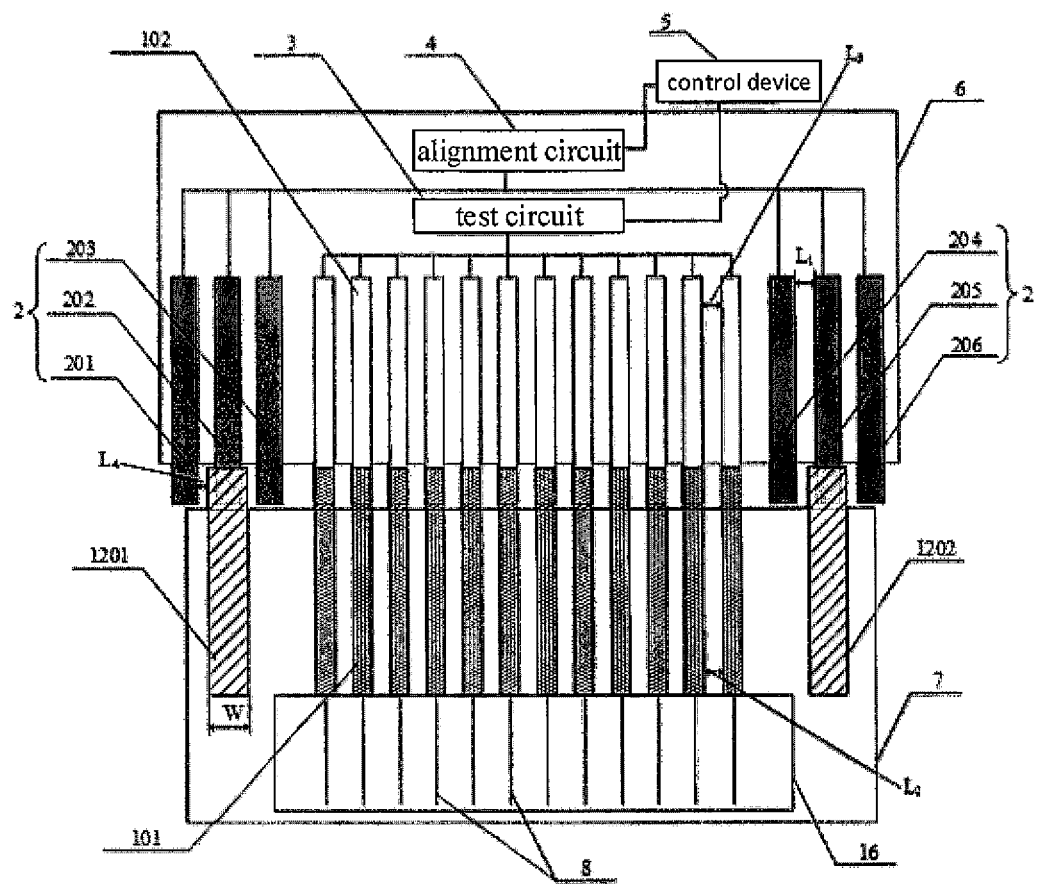
FIG. 4A to 4C are schematic diagrams of an alignment detection method provided by an embodiment of the present disclosure.
Figure 4B:
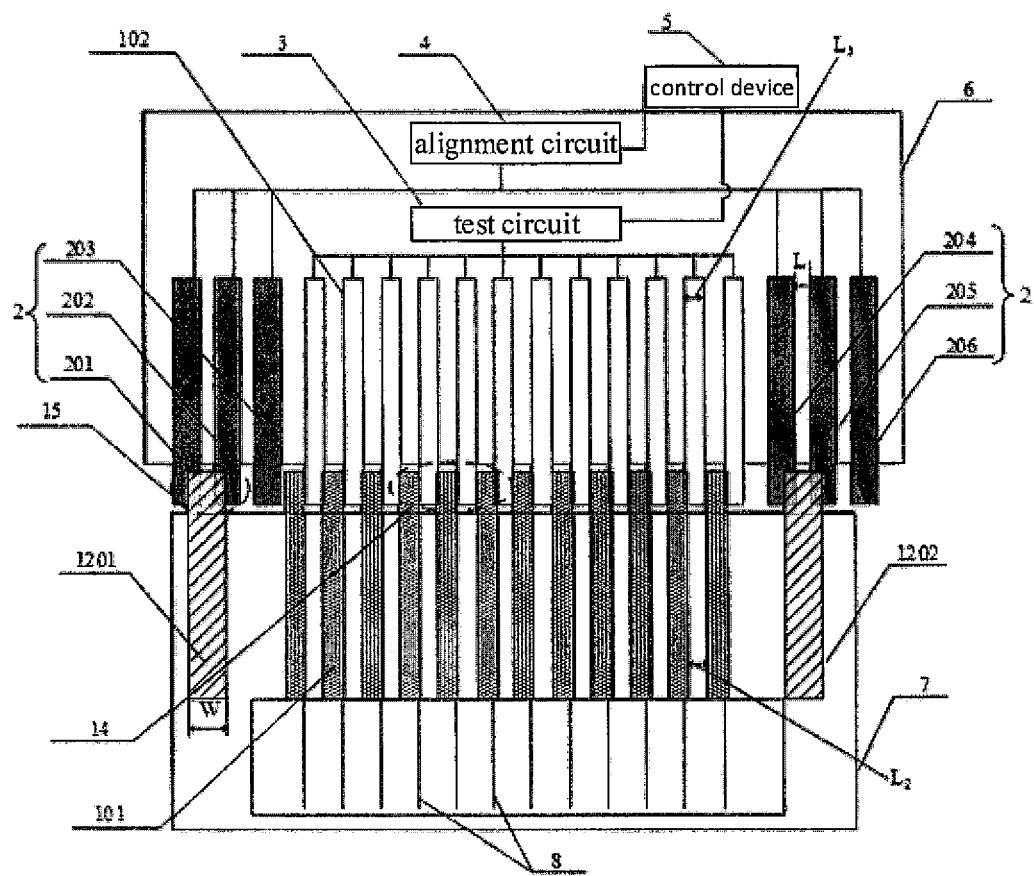
Figure 4C:
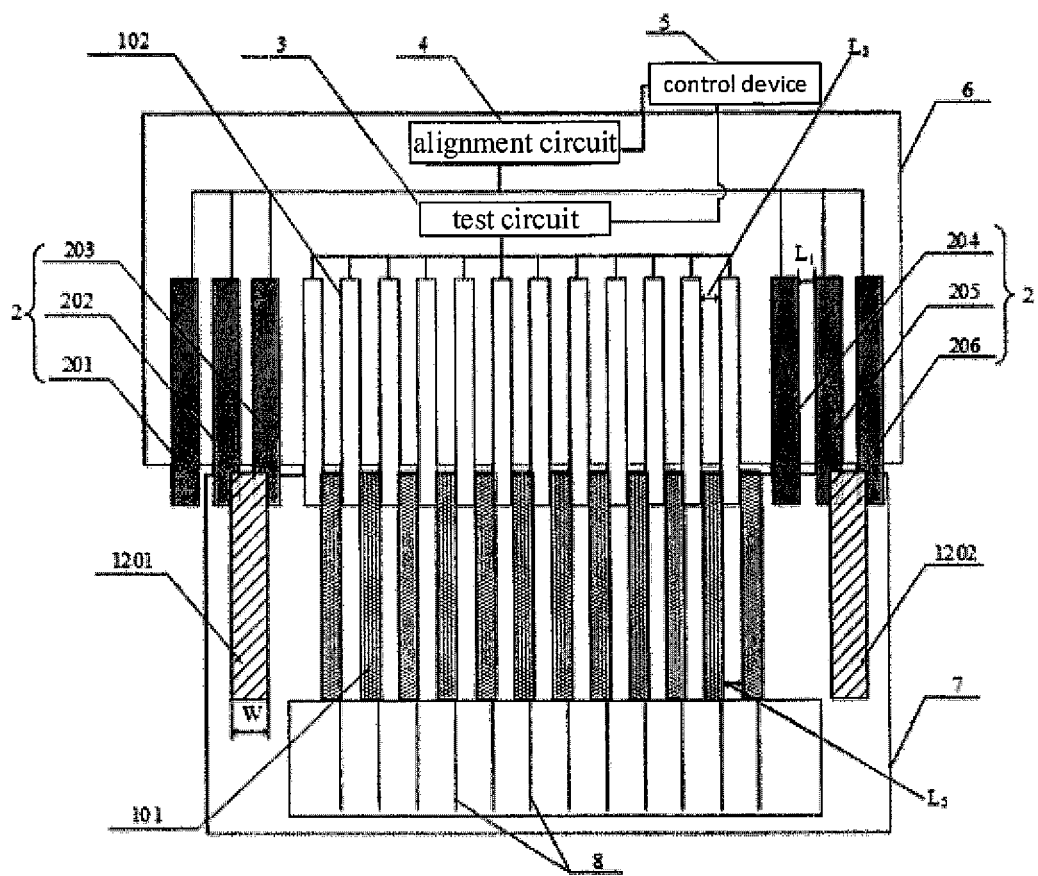
Figure 5A:
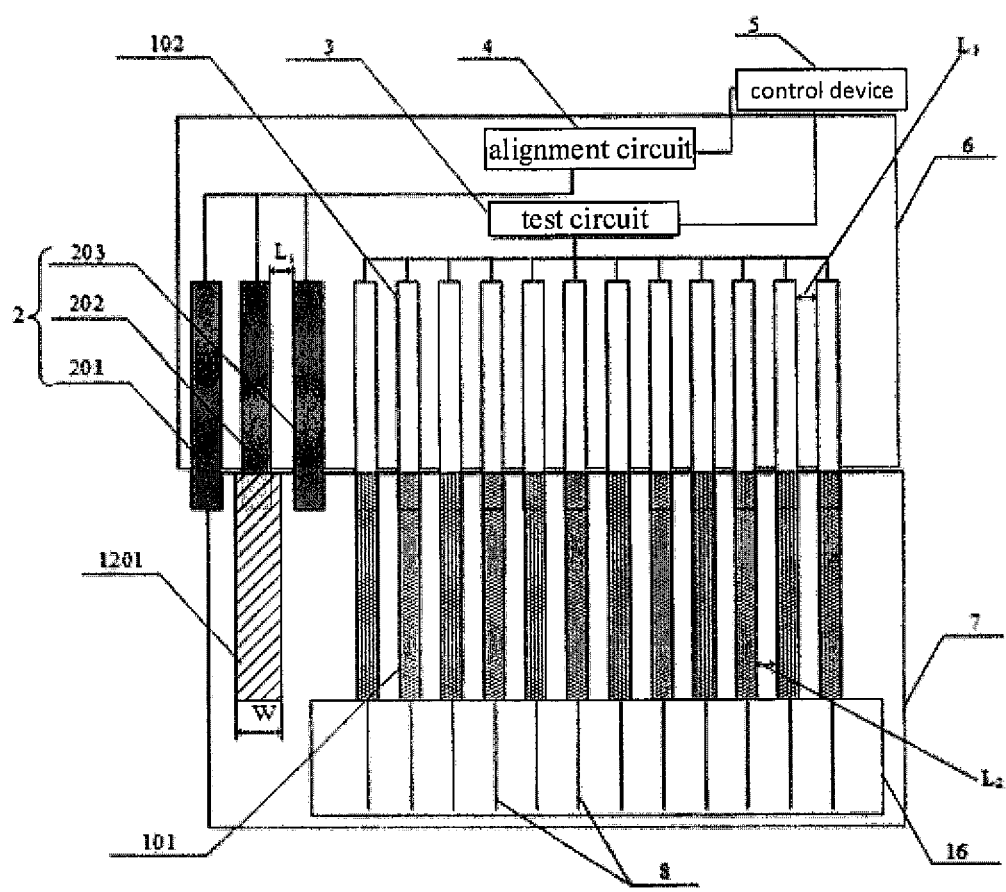
FIG. 5A to 5C are schematic diagrams of another alignment detection method provided by an embodiment of the present disclosure.
Figure 5B:
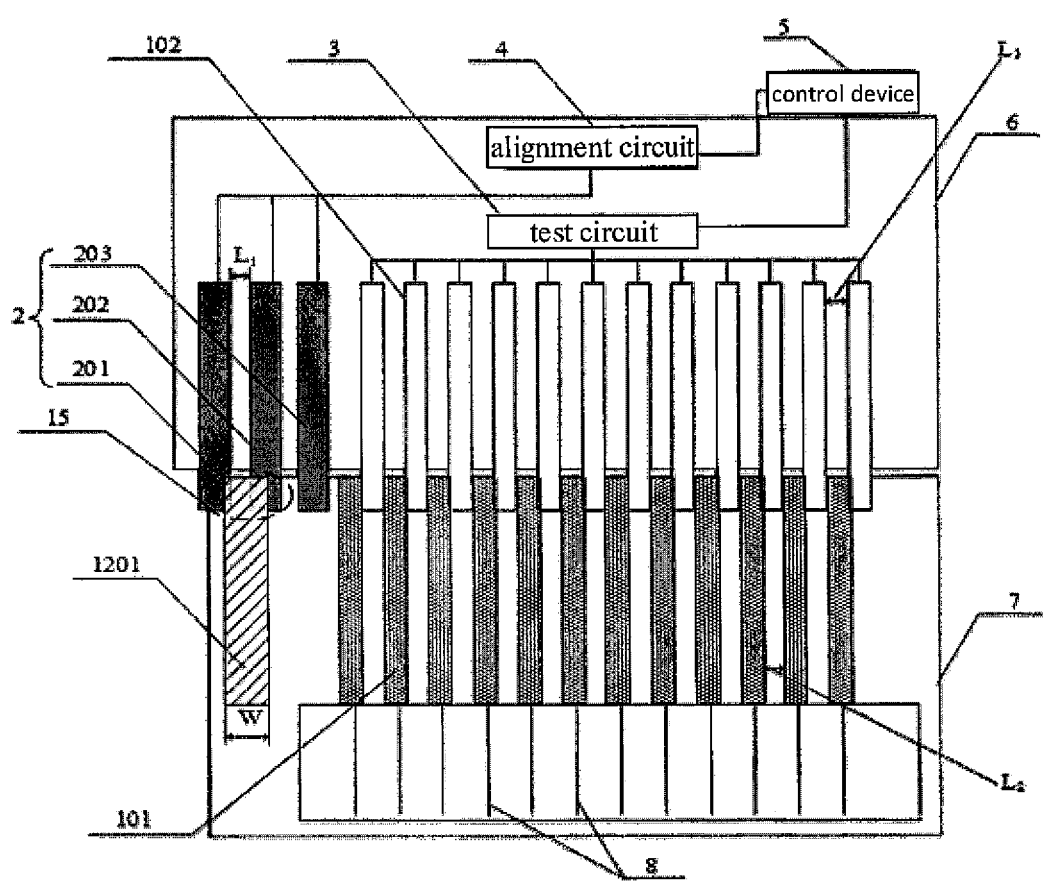
Figure 5C:
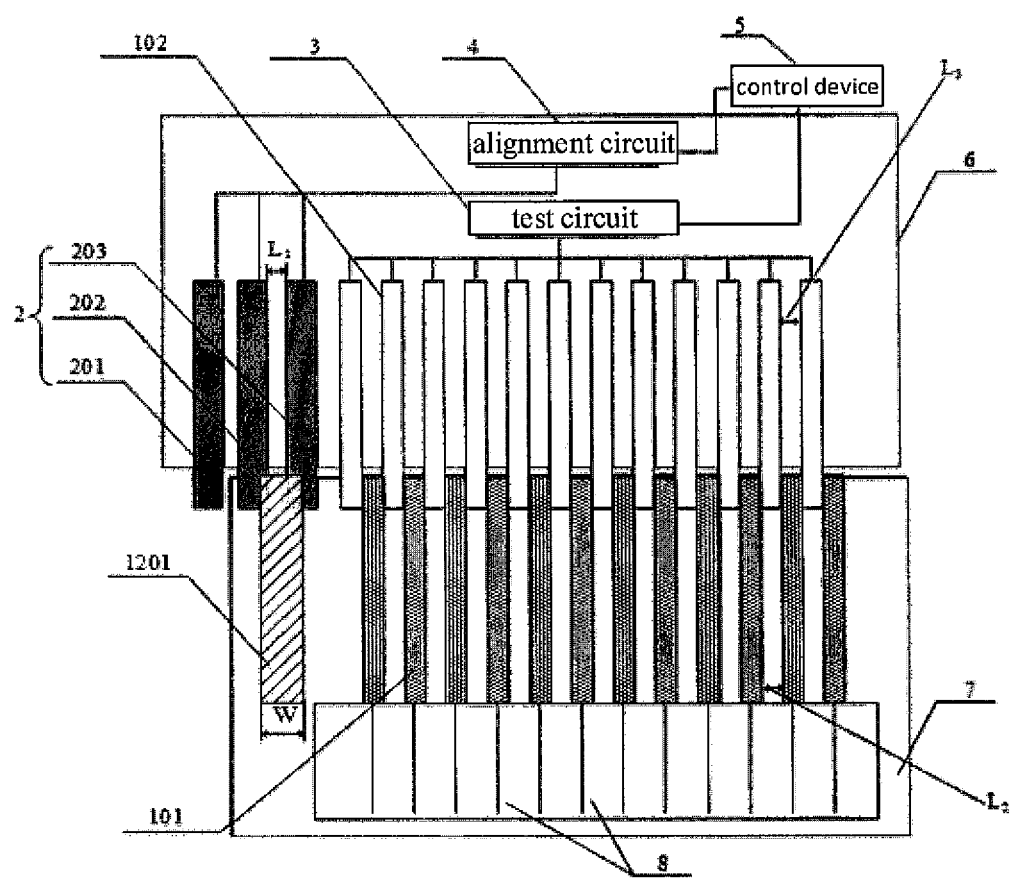
Figure 6A:
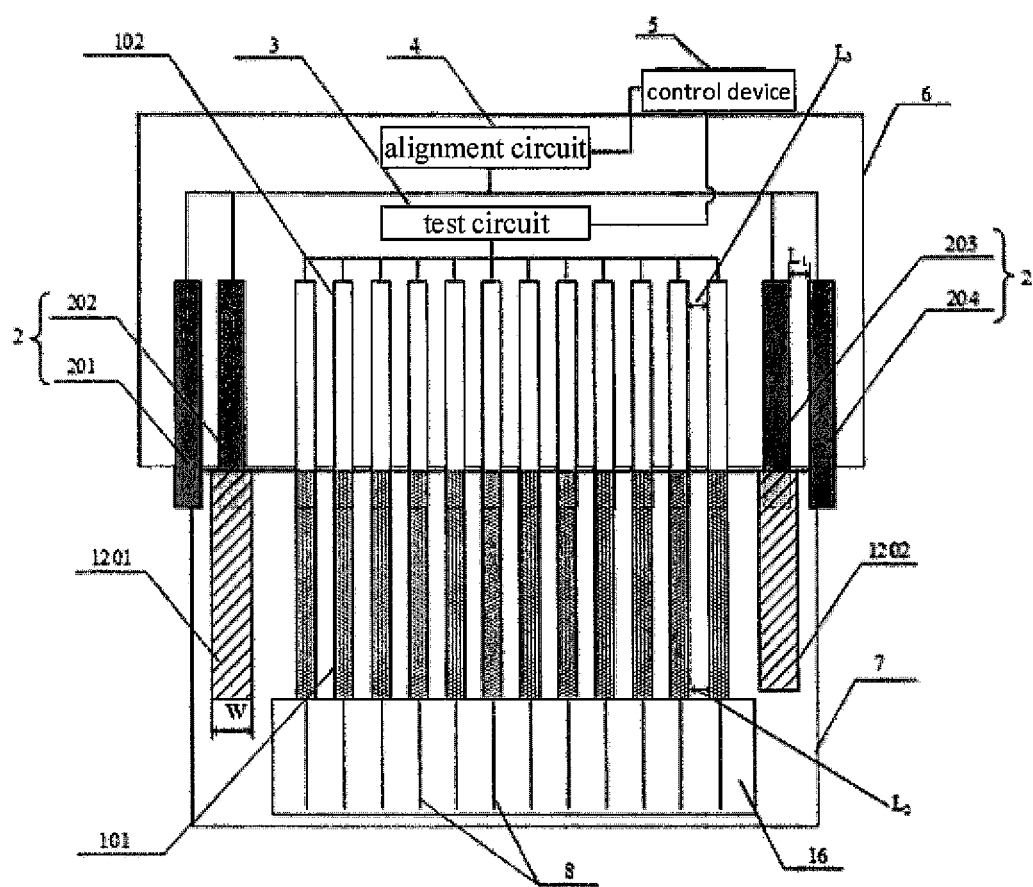
FIG. 6A to 6C are schematic diagrams of another alignment detection method provided by an embodiment of the present disclosure.
Figure 6B:
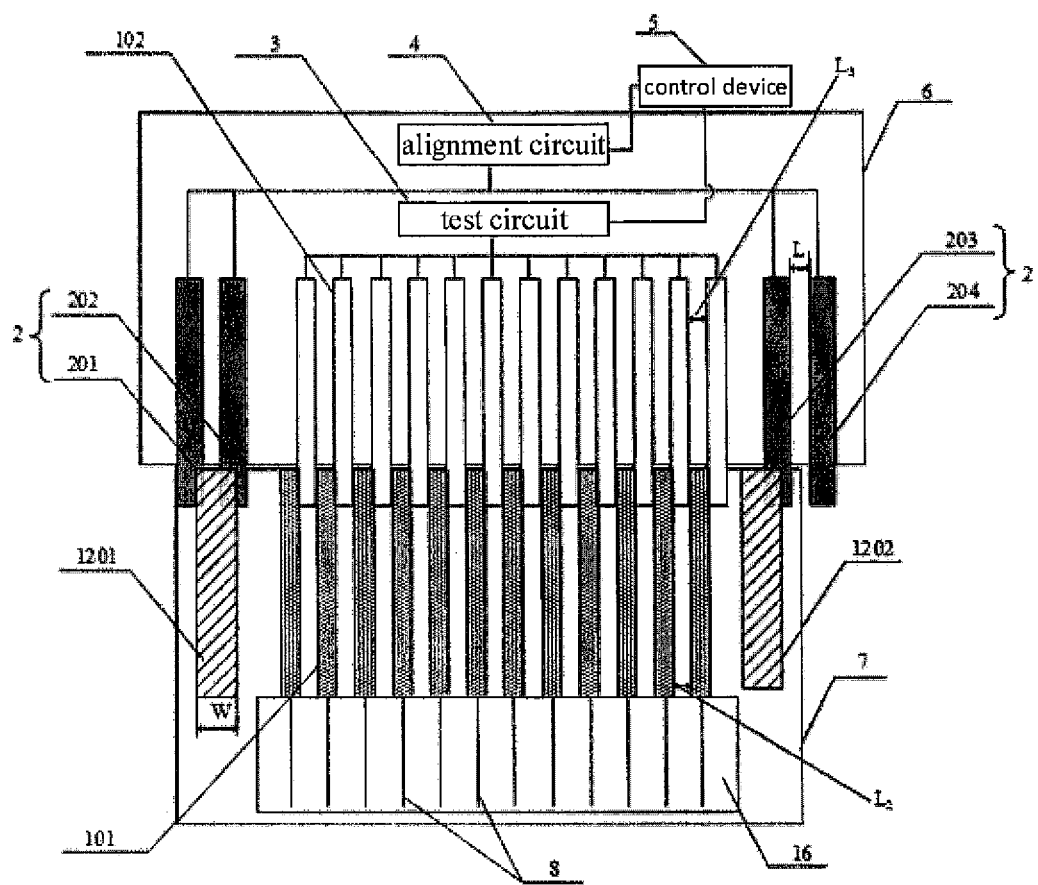
Figure 6C:
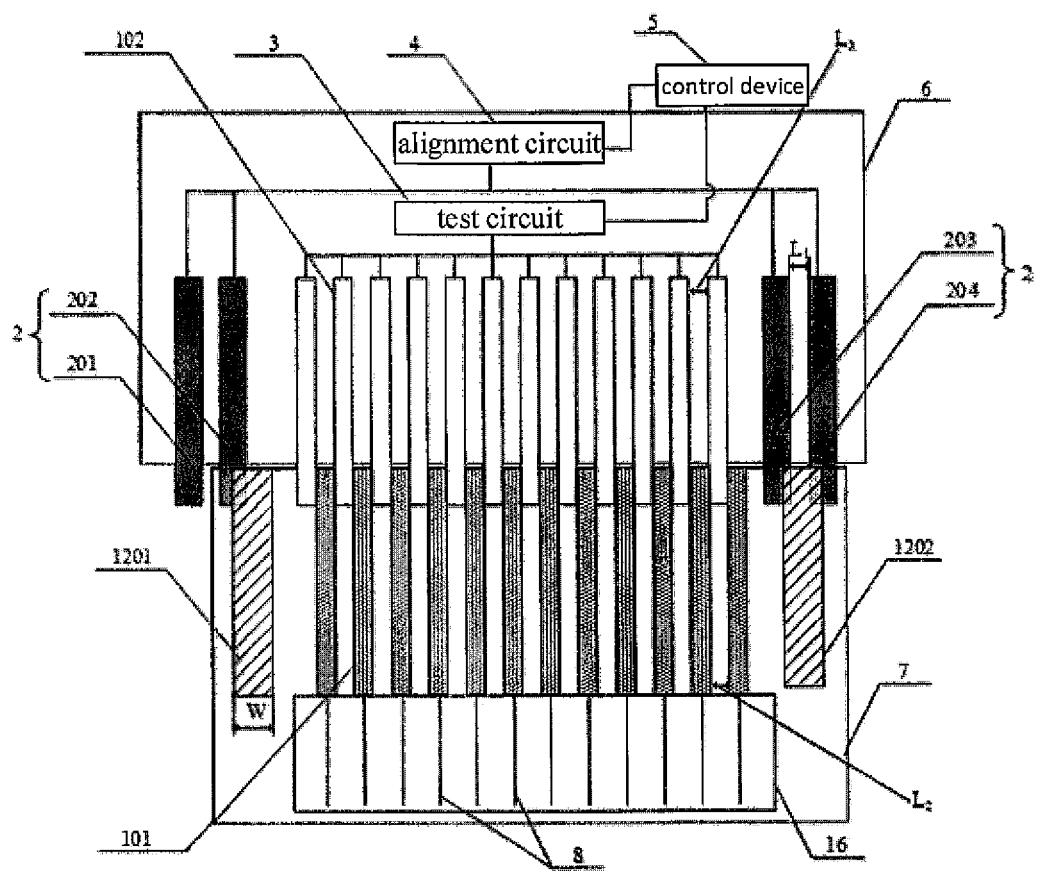
Figure 7A:
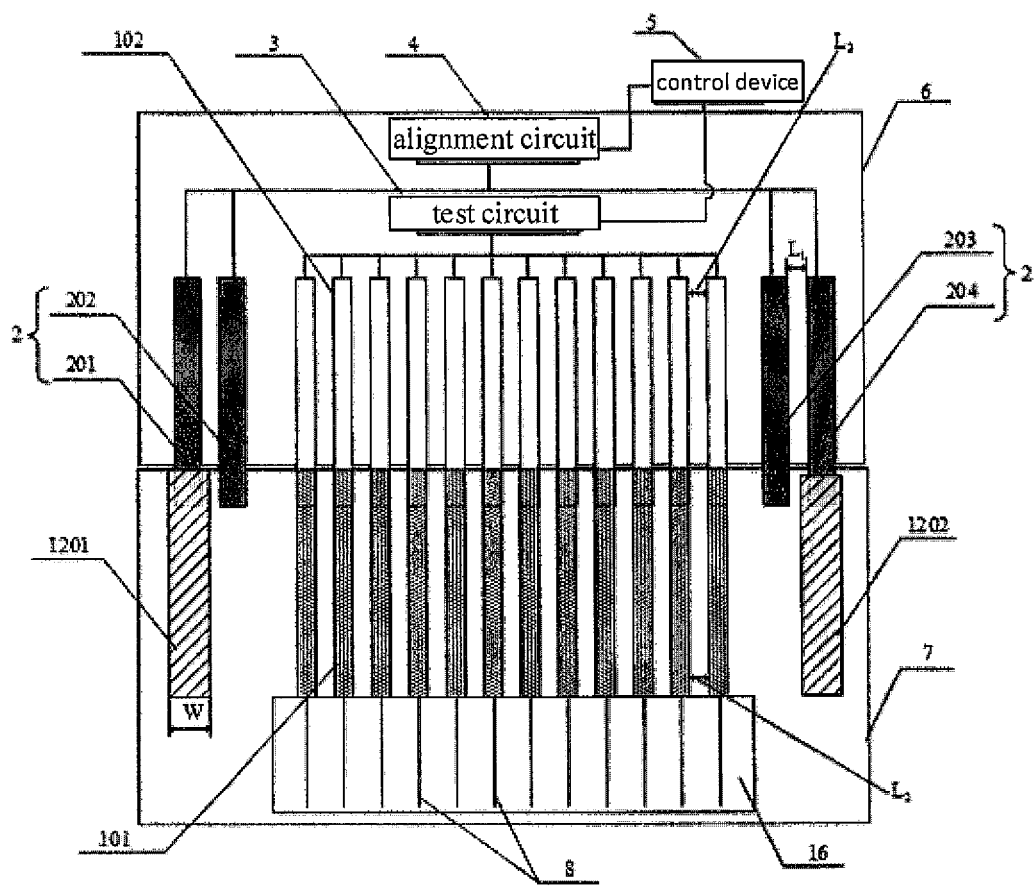
FIG. 7A to 7C are schematic diagrams of another alignment detection method provided by an embodiment of the present disclosure.
Figure 7B:
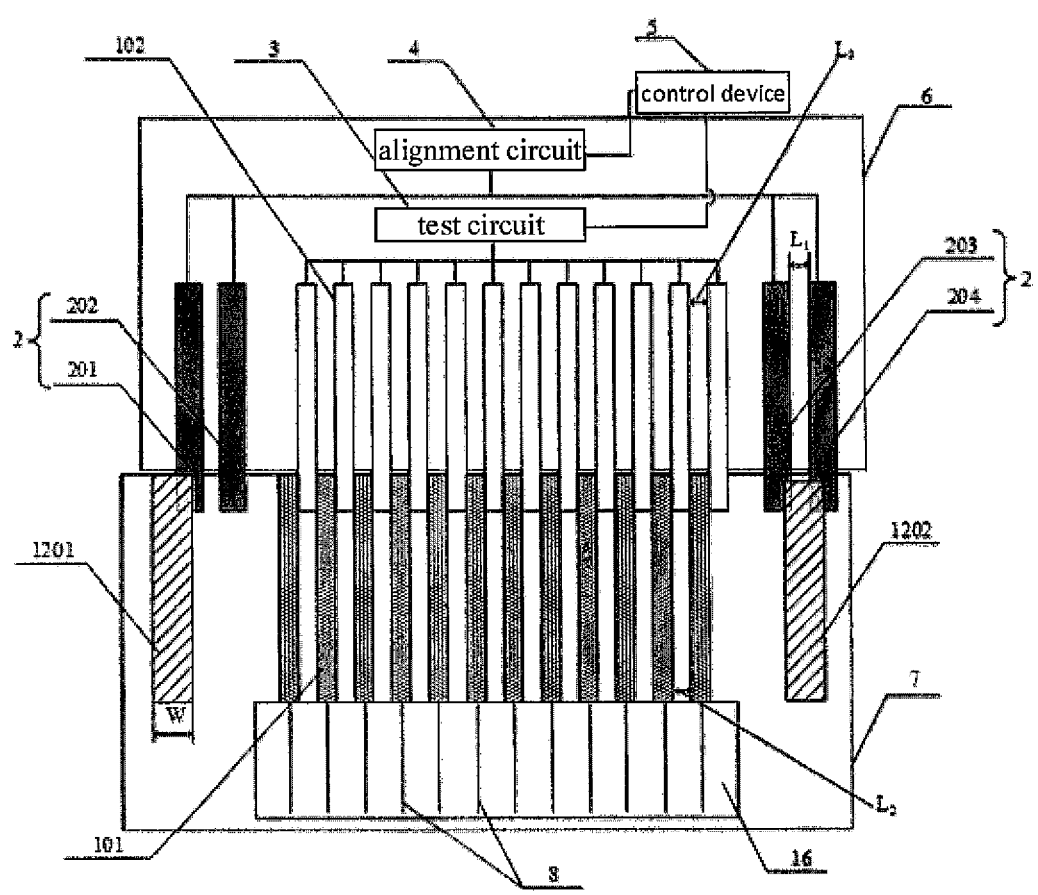
Figure 7C:
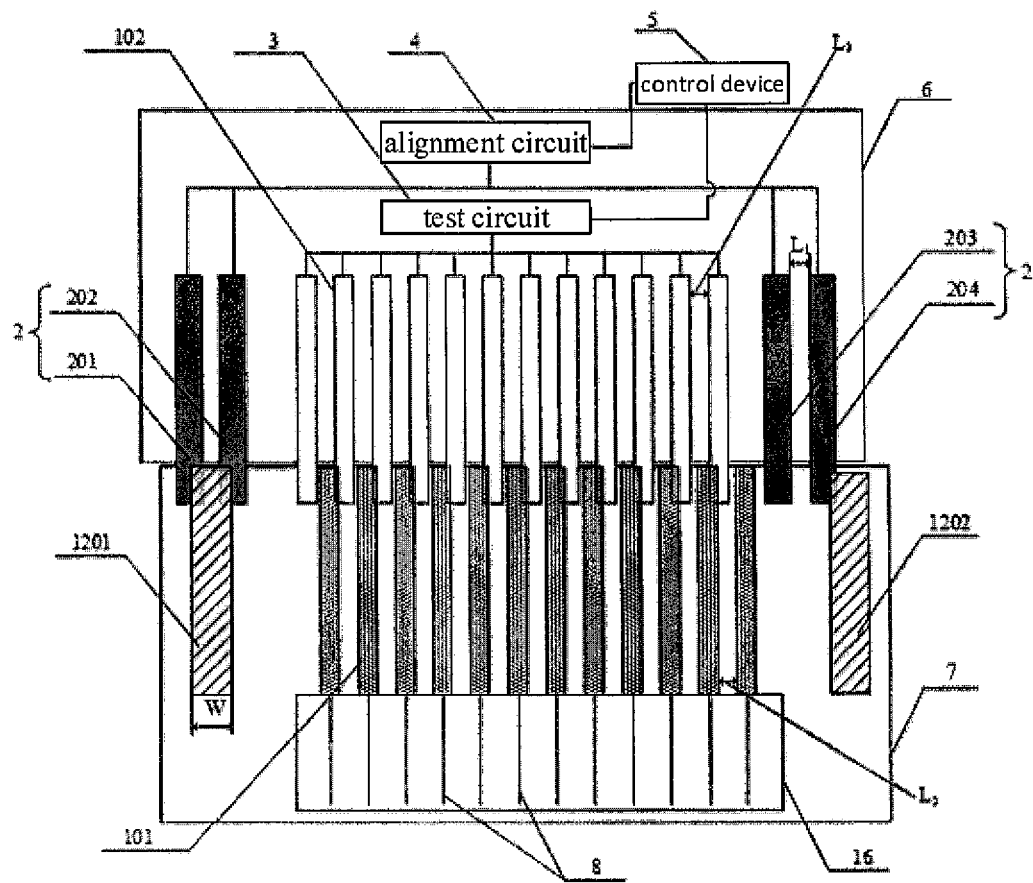

FIG. 4A to 4C are schematic diagrams of an alignment detection method provided by an embodiment of the present disclosure. FIG. 5A to 5C are schematic diagrams of another alignment detection method provided by an embodiment of the present disclosure. FIG. 6A to 6C are schematic diagrams of another alignment detection method provided by an embodiment of the present disclosure. FIG. 7A to 7C are schematic diagrams of another alignment detection method provided by an embodiment of the present disclosure.

Exemplarily, as illustrated in FIGS. 4A to 4C, a substrate in an embodiment of the present disclosure is provided. In the substrate, the first alignment detection pins are located on both sides of first signal connection pins 101 in an arrangement direction of the first signal connection pins 101, and the number of the first alignment detection pin on each side is 1. A detection device in any one of the above embodiments of the present disclosure is provided. In the detection device, the second alignment detection pins 2 are located on both sides of the second signal connection pins 102, and the number of the second alignment detection pins 2 on each side is 3. First signal connection pins 101 of the substrate are electrically connected with second signal connection pins 102 of the detection device one-by-one.

Before applying the detection signals to the second signal connection pins 102, the alignment circuit 4 is controlled by the controller 5 to input alignment signals such as electrical signals to the second alignment detection pin 202/205.

Alignment detection is performed to detect whether the first signal connection pins 101 and the second signal connection pins 102 are aligned accurately, that is, whether the first signal connection pins 101 and the second signal connection pins 102 are aligned one by one.

For example, whether the first signal connection pins are aligned accurately with second signal connection pins can be determined by detecting whether the adjacent second alignment detection pins of the detection device are electrically connected by the first alignment detection pins. For example, the alignment detection result signals are electrical signals, and the accuracy of alignment between the first signal connection pins and the second signal connection pins can be determined by detecting whether there is a current on the second alignment detection pins.

Exemplarily, the alignment circuit 4 comprises galvanometers in series with the second alignment detection pin 201/203/204/206, respectively, to detect whether there is an electrical signal feedback on the second alignment detection pin 201/203/204/206 in the alignment detection process. The alignment detection results can be judged according to the display results of the galvanometers.

For example, as illustrated in FIG. 4A, in a case that the first signal connection pins 101 and the second signal connection pins 102 are aligned accurately, the first alignment detection pin 1201 are electrically connected with the second alignment detection pin 202 in the middle according to the arrangement direction of the second alignment detection pins 2, and the second alignment detection pin 205 is electrically connected with the first alignment detection pin 1202 directly. At this time, the second alignment detection pins 201/203/204/206 are in a non-conducting state, and no feedback electrical signal is received. The galvanometer in series with the second alignment detection pin 201/203/204/206 shows no current. That is to say, there is no feedback on the result signal of the alignment detection on the second alignment detection pins 201/203/204/206 located on both sides of the second alignment detection pins 202/205 in the middle. At this time, the alignment detection result is accurate alignment, and the working state of the substrate can be detected.

Figure 8:
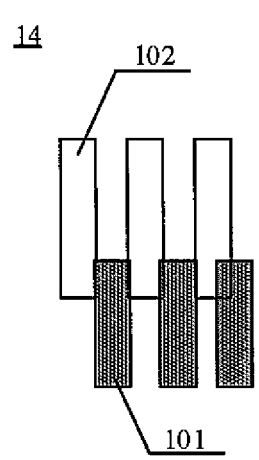
FIG. 8 is a locally enlarged schematic diagram of a signal connection region in FIG. 4B.
Figure 9:
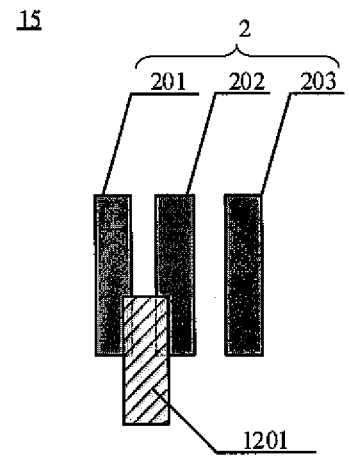
FIG. 9 is a locally enlarged schematic diagram of an alignment detection region in FIG. 4B.

In a case that the first signal connection pins 101 are aligned inaccurately with the second signal connection pins 102, the first alignment detection pin 1201/1202 is electrically connected with the second alignment detection pin 202/205 located in the middle according to the arrangement direction of the second alignment detection pins 2. The first alignment detection pin 1201/1202 is also electrically connected with the second alignment detection pin 201 and the second alignment detection pin 204 located on both sides of the second signal connection pins 102 respectively, and the second alignment detection pin 201 and the second alignment detection pin 204 feedback the alignment detection result signals. Alternatively, the first alignment detection pin 1201/1202 is also electrically connected with the second alignment detection pin 203 and the second alignment detection pin 206 on both sides of the second signal connection pins 102, respectively, and the second alignment detection pin 203 and the second alignment detection pin 206 feedback the alignment detection result signals. FIG. 8 is a locally enlarged schematic diagram of a signal connection region in FIG. 4B, and FIG. 9 is a locally enlarged schematic diagram of an alignment detection region in FIG. 4B. For example, by combining FIG. 4B with FIG. 8 and FIG. 9, in a case that the first signal connection pins 101 shift to the left in FIG. 4B, the adjacent second alignment detection pins 201/202 are electrically connected by direct contact with the first alignment detection pin 1201, and the adjacent second alignment detection pins 204/205 are electrically connected by direct contact with the first alignment detection pin 1202. At this time, the second alignment detection pins 201/202 and the first alignment detection pin 1201 form a circuit, and the second alignment detection pins 204/205 and the first alignment detection pin 1202 form a circuit, and thus the second alignment detection pin 201 and the second alignment detection pin 204 feedback electrical signals, that is, the second alignment detection pins 201/204 return the alignment detection result signals. The galvanometer connected in series with the second alignment detection pin 201/204 shows a current, and the galvanometer connected in series with the second alignment detection pin 203/206 shows no current. It indicates that the result of the alignment detection is inaccurate alignment and the first signal connection pins shift to the left in FIG. 4B, and the tester can be guided to move the substrate towards the right so as to facilitate accurate alignment.

For example, as illustrated in FIG. 4C, in a case that the first signal connection pins 101 shift to the right in FIG. 4C, the adjacent second alignment detection pins 203/202 are electrically connected by direct contact with the first alignment detection pin 1201, and the adjacent second alignment detection pins 206/205 are electrically connected by direct contact with the first alignment detection pin 1202. At this time, the second alignment detection pins 203/202 and the first alignment detection pin 1201 form a circuit, and the second alignment detection pins 206/205 and the first alignment detection pin 1202 alignment detection pins form a circuit, and thus the second alignment detection pin 203 and the second alignment detection pin 206 feedback electrical signals, that is, the second alignment detection pins 203/206 return the alignment detection result signals. The galvanometer in series with the second alignment detection pin 203/206 shows a current, and the galvanometer in series with the second alignment detection pin 201/204 shows no current. It indicates that the alignment detection result signal is inaccurate alignment, and the first signal connection pins shift to the right in FIG. 4C, and the tester can be guided to move the substrate towards the left for accurate alignment.

In a case that the result of alignment detection is inaccurate alignment, the relative positions of the first signal connection pins and the second signal connection pins are adjusted according to the obtained result, and then the alignment detection is carried out again. The working state of the substrate will not be detected until the alignment detection result is accurate alignment. As such, the problem of short circuit caused by the inaccurate alignment of the first signal connection pins and the second signal connection pins is prevented, and thus the damage to the signal lines and other devices on the substrate can be avoided.

For another example, as illustrated in FIG. 5A to 5C, in the substrate, the first alignment detection pin 1201 may be located only on one side of first signal connection pins 101 in the arrangement direction of first signal connection pins 101, and only one first alignment detection pin 1201 is arranged on the side. Accordingly, in the detection device, the second alignment detection pins 2 are only located on one side of the second signal connection pins 102, and the number of the second alignment detection pins 2 on this side is 3.

In the example, the alignment circuit 4 comprises galvanometers connected in series with the second alignment detection pin 201/203, respectively, to detect whether there is electrical signal feedback on the second alignment detection pin 201/203 in the alignment detection process. The alignment detection result is judged according to the display results of the galvanometers.

As illustrated in FIG. 5A, in a case that the first signal connection pins 101 and the second signal connection pins 102 are aligned accurately, the first alignment detection pin 1201 is electrically connected with the second alignment detection pin 202 in the middle according to the arrangement direction of the second alignment detection pins 2. At this time, the second alignment detection pins 201/203 are in the non-conducting state, and no electrical signal is fed back. The galvanometers in series with the second alignment detection pins 201/203 show no current. That is to say, there is no feedback of the alignment detection result signal on the second alignment detection pins 201/203 located on both sides of the second alignment detection pins 202 in the middle. At this time, the alignment detection result is accurate alignment, and the working state of the substrate can be detected.

In a case that the first signal connection pins 101 are aligned inaccurately with the second signal connection pins 102, for example, as illustrated in FIG. 5B, the first signal connection pins 101 shift to the left in FIG. 4B, the adjacent second alignment detection pins 201/202 are electrically connected with the first alignment detection pin 1201 directly. At this time, the second alignment detection pin 201/202 and the first alignment detection pin 1201 form a circuit, and thus the second alignment detection pin 201 feeds back electrical signals. The galvanometer connected in series with the second alignment detection pin 201 shows a current, and the galvanometer connected in series with the second alignment detection pin 203 shows no current. This indicates that the result of the alignment detection is inaccurate alignment, and the first signal connection pins shift to the left in FIG. 5B, and the tester can be guided to move the substrate towards the right so as to facilitate accurate alignment.

For example, as illustrated in FIG. 5C, in a case that the first signal connection pins 101 shifts to the right in FIG. 5C, the adjacent second alignment detection pins 203/202 are electrically connected by direct contact with the first alignment detection pin 1201. At this time, the second alignment detection pins 203/202 and the first alignment detection pin 1201 form a circuit, and thus the second alignment detection pin 203 and the second alignment detection pin 206 feedback electrical signals, that is, the second alignment detection pins 203/206 return the alignment detection result signals. The galvanometer in series with the second alignment detection pin 203 shows a current, and the galvanometer in series with the second alignment detection pin 201 shows no current. This indicates that the result of the alignment detection is inaccurate alignment, and the first signal connection pins shift to the right in FIG. 5C, and the tester can be guided to move the substrate towards the left so as to facilitate accurate alignment.

For another example, as illustrated in FIG. 6A to 6C, the first alignment detection pins may be located on both sides of the first signal connection pins 101 of the substrate in the arrangement direction of the first signal connection pins 101, and the number of the first alignment detection pins on each side is 1. Accordingly, in the detection device, the second alignment detection pins 2 are located on both sides of the second signal connection pins 102 in the alignment direction of the second signal connection pins 102, and the number of the second alignment detection pins 2 on each side is 2.

For example, the alignment circuit 4 comprises galvanometers connected in series with the second alignment detection pin 201/204, respectively, to detect whether there is electrical signal feedback on the second alignment detection pin 201/204 in the alignment detection process. The alignment detection result is judged according to the display results of the galvanometers.

As illustrated in FIG. 6A, for example, in a case that the first signal connection pins 101 and the second signal connection pins 102 are aligned accurately, two second alignment detection pins close to the second signal connection pins 102 are electrically connected with the first alignment detection pins respectively, that is, the second alignment detection pin 202 is electrically connected by direct contact with the first alignment detection pin 1201, and the second alignment detection pin 203 is electrically connected by direct contact with the first alignment detection pin 1202. At this time, the second alignment detection pins 201/204 are in the non-conducting state, and no electrical signal is fed back. The galvanometers in series with the second alignment detection pin 201/204 show no current. That is to say, there is no feedback of the alignment detection result signal on the two second detection pins 201/204 away from the second signal connection pins 102. At this time, the alignment detection result is accurate alignment and the working state of the substrate can be detected.

In a case that the first signal connection pins 101 are inaccurately aligned with the second signal connection pins 102, for example, as illustrated in FIG. 6B, the first signal connection pins 101 shifts to the left in FIG. 6B, the two second alignment detection pins 201/202 on the same side of the second signal connection pins 102 are electrically connected by direct contact with the first alignment detection pin 1201. At this time, the second alignment detection pins 201/202 and the first alignment detection pins 1201 form a circuit, and thus the second alignment detection pin 201 feeds back electrical signals. The second alignment detection pin 204 is in a non-conducting state and does not feed back the electrical signal. Therefore, the galvanometer in series with the second first alignment detection pin 201 shows a current, and the galvanometer in series with the second alignment detection pin 204 shows no current. That is, one of the two second alignment detection pins away from the second signal connection pins 102 feeds back the alignment detection result signal. This indicates that the alignment detection result is inaccurate alignment, and the first signal connection pins shift to the left in FIG. 6B, and the tester can be guided to move the substrate towards the right in order to facilitate accurate alignment.

For example, as illustrated in FIG. 6C, in a case that the first signal connection pins 101 shifts to the right in FIG. 6C, the two second alignment detection pins 203/204 located on the same side of the second signal connection pins 102 are electrically connected by direct contact with the first alignment detection pin 1202. At this time, the second alignment detection pins 203/204 and the first alignment detection pin 1202 form a circuit, and thus the second alignment detection pin 204 feeds back the electrical signals. The second alignment detection pin 201 is in a non-conducting state and does not feed back the electrical signal. Therefore, the galvanometer connected in series with the second alignment detection pin 204 shows a current, and the galvanometer connected in series with the second alignment detection pin 201 shows no current. This indicates that the result of the alignment detection is inaccurate alignment, and the first signal connection pins shift to the right of FIG. 6C, and the tester can be guided to move the substrate towards the left in order to facilitate accurate alignment.

In another example of the disclosure, in the alignment detection method shown in FIGS. 7A to 7C, for example, the alignment circuit 4 comprises galvanometers in series with the second alignment detection pins 202/203, respectively, to detect whether there is electrical signal feedback on the second alignment detection pins 202/203 in the alignment detection process. The alignment detection result is judged according to the display results of galvanometers.

As illustrated in FIG. 7A, for example, in a case that the first signal connection pins 101 are aligned accurately with the second signal connection pins 102, two second alignment detection pins away from the second signal connection pins 102 are electrically connected with the first alignment detection pins respectively. That is, the second alignment detection pins 201 and the first alignment detection pins 1201 are electrically connected by direct contact, while the second alignment detection pins 204 and the first alignment detection pin 1202 are electrically connected by direct contact. At this time, the second alignment detection pins 202/203 are in the non-conducting state and do not feed back the electrical signal. The galvanometers in series with the second alignment detection pin 202/203 shows no current. That is to say, there is no feedback of the alignment detection result signal on the two second detection pins 202/203 close to the second signal connection pins 102. At this time, the alignment detection result is accurate alignment and the working state of the substrate can be detected.

In a case that the first signal connection pins 101 are inaccurately aligned with the second signal connection pins 102, for example, as illustrated in FIG. 7B, the first signal connection pins 101 shifts to the left in FIG. 7B, the two second alignment detection pins 203/204 on the same side of the second signal connection pins 102 are electrically connected by direct contact with the first alignment detection pins 1202. At this time, the second alignment detection pins 203/204 and the first alignment detection pin 1202 form a circuit, and thus the second alignment detection pin 203 feeds back electrical signals. The second alignment detection pin 202 is in a non-conducting state and does not feedback the electrical signal. Therefore, the galvanometer in series with the second alignment detection pin 203 shows a current, while the galvanometer in series with the second alignment detection pin 202 shows no current. That is, one of the two second alignment detection pins close to the second signal connection pins 102 feeds back the alignment detection result signal. This indicates that the alignment detection result is inaccurate alignment and the first signal connection pins shifts to the left in FIG. 7B, and the tester can be guided to move the substrate towards the right in order to facilitate accurate alignment.

For example, as illustrated in FIG. 7C, in a case that the first signal connection pins 101 shifts to the right in FIG. 7C, the two second alignment detection pins 201/202 located on the same side of the second signal connection pins 102 are electrically connected by direct contact with the first alignment detection pin 1201. At this time, the second alignment detection pins 201/202 and the first alignment detection pin 1201 form a circuit, and thus the second alignment detection pin 202 feeds back the electrical signal. The second alignment detection pin 203 is in a non-conducting state and does not feedback the electrical signal. Therefore, the galvanometer in series with the second alignment detection pin 202 shows a current, and the galvanometer in series with the second alignment detection pin 203 shows no current. This indicates that the result of the alignment detection is inaccurate alignment, and the first signal connection pins shift to the right in FIG. 7C, and the tester can be guided to move the substrate towards the left in order to facilitate accurate alignment.

In the examples of the present disclosure, the second alignment detection pins for example are equally spaced and there is a first spacing between adjacent second alignment detection pins, and at least one of the first alignment detection pins has a width greater than the first spacing. For example, as shown in FIG. 4A to 4C, the second alignment detection pins are equally spaced and there is a first spacing L1 between adjacent second alignment detection pins, and the width of the first alignment detection pin 1201/1202 is W which is greater than L1. This ensures that the first alignment detection pin 1201 can simultaneously contact the two adjacent first alignment detection pins and be electrically connected in a case that the above mentioned misalignment occurs, and thus the detection result signal of misalignment can be fed back.

For example, as illustrated in FIG. 4A to 4C, first signal connection pins 101 are periodically arranged having a second spacing L2 between adjacent first signal connection pins, and the second signal connection pins 102 are periodically arranged having a third spacing L3 between adjacent second signal connection pins, and the second spacing L2 is equal to the third spacing L3. Thus, in a case that the first signal connection pins 101 are aligned with the second signal connection pins 102, it is not easy to form a short circuit because the second spacing L2 or the third spacing L3 is too small. Here, the widths of the first signal connection pins 101 are equal to those of the second signal connection pins 102, so the first spacing L1 is equal to the third spacing L3. In a case that the widths of the first signal connection pins 101 are not equal to the widths of the second signal connection pins 102, the first spacing L1 is not equal to the third spacing L3.

Exemplarily, in FIG. 4A, in a case that the first signal connection pins 101 are electrically connected to the second signal connection pins 102 one by one, there is a fourth spacing L4 between the first alignment detection pin 1201 and the adjacent second alignment detection pin 201. The fourth spacing L4 is less than or equal to the second spacing L2. In a case that a shifting distance of the first signal connection pins 101 is L2, a short circuit will be formed. At this time, the shifting distance of the first alignment detection pin 1201 is also L2. L2 is less than L4, which can ensure that the first alignment detection pin 1201 contacts the second alignment detection pin 201 to form a circuit. Thus, the second alignment detection pin 201 can feed back the detection result signal of misalignment, which can ensure that the misalignment can be detected so as to avoid the damage to the substrate caused by short circuit of the first signal connection pins 101 and the second signal connection pins 102.

It should be noted that in embodiments of the present disclosure, the number of the first alignment detection pins and the second alignment detection pins are not limited to that shown in the given examples, other numbers can be comprised in the technical scheme of the present disclosure as long as the principle of the alignment detection method provided in embodiments of the present disclosure is used.

What are described above is related to only the illustrative embodiments of the present disclosure and not limitative to the scope of the application. The scope of the present application shall be defined by the accompanying claims.

What is claimed is:

1. A substrate, comprising:
   first signal connection pins arranged in parallel side by side;
   at least one first alignment detection pin, which is located on at least one side of the first signal connection pins in an arrangement direction of the first signal connection pins, and arranged in parallel with the first signal connection pins, wherein the at least one first signal connection pin has a first end and a second end opposite to the first end, the first end is electrically connected with a signal line, the second end is flush with an end face of the at least one first alignment detection pin on a side away from the signal line, and a shape of the at least one first alignment detection pin is a straight strip, and a conductivity of a material of the at least one first alignment detection pin is greater than a conductivity of a material of the first signal connection pins.

2. The substrate according to claim 1, further comprising a working region, wherein the working region is provided with signal lines arranged in parallel to each other;
   each of the first signal connection pins has a first end and a second end; and the first end of each of the first signal connection pins is electrically connected with one of the signal lines.

3. The substrate according to claim 1, wherein the at least one first alignment detection pin is suspended.

4. A panel, comprising the substrate according to claim 1.

5. A detection device, comprising: second signal connection pins arranged in parallel side by side; second alignment detection pins, located on at least one side of the second signal connection pins in an arrangement direction of the second signal connection pins, and arranged in parallel with the second signal connection pins;
   a number of the second alignment detection pins located on each side of the second signal connection pins is 3; in an arrangement direction of the second alignment detection pins on the each side, the second alignment detection pin in the middle is used to receive the alignment signal from an alignment circuit, and accordingly, the second alignment detection pins on both sides of the second alignment detection pin in the middle are used to send the alignment detection result signal, each of the second signal connection pins has a first end and a second end opposite to the first end, the first end is electrically connected with a test circuit, the second end is flush with end faces of the second alignment detection pins on a side away from the test circuit, and a conductivity of a material of the second alignment detection pins is greater than a conductivity of a material of the second signal connection pins.

6. The detection device according to claim 5, wherein the test circuit is configured to send test signals to the second signal connection pins; and the detection device further comprising an alignment circuit, which is electrically connected with the second alignment detection pins and configured to send an alignment signal to the signal input second alignment detection pin and receive an alignment detection result signal from the signal feedback second alignment detection pin.

7. The detection device according to claim 6, wherein the second signal connection pins are configured to receive the test signals from the test circuit, and the second alignment detection pins are configured to receive the alignment signals from the alignment circuit and return the alignment detection result signals.

8. The detection device according to claim 6, further comprising: a control device, wherein the control device is configured to control turning on and turning off of the test circuit and the alignment circuit, and control the test circuit to send test signals to the second signal connection pins and control the alignment circuit to send alignment signals to the signal input second alignment detection pin.

9. An alignment detection method, comprising:
   providing a substrate, wherein the substrate comprises: first signal connection pins arranged in parallel side by side; at least one first alignment detection pin, which is located on at least one side of the first signal connection pins in an arrangement direction of the first signal connection pins, and arranged in parallel with the first signal connection pins, wherein the at least one first signal connection pin has a first end and a second end opposite to the first end, the first end is electrically connected with a signal line, the second end is flush with an end face of the at least one first alignment detection pin on a side away from the signal line, and a shape of the at least one first alignment detection pin is a straight strip, and a conductivity of a material of the at least one first alignment detection pin is greater than a conductivity of a material of the first signal connection pins;
   providing a detection device, wherein the detection device comprises: a second signal connection pins arranged in parallel side by side; second alignment detection pins, located on at least one side of the second signal connection pins in an arrangement direction of the second signal connection pins, and arranged in parallel with the second signal connection pins, a number of the second alignment detection pins located on each side of the second signal connection pins is 3; in an arrangement direction of the second alignment detection pins on the each side, the second alignment detection pin in the middle is used to receive the alignment signal from the alignment circuit, and accordingly, the second alignment detection pins on both sides of the second alignment detection pin in the middle are used to send the alignment detection result signal, each of the second signal connection pins has a first end and a second end opposite to the first end, the first end is electrically connected with a test circuit, the second end is flush with end faces of the second alignment detection pins on a side away from the test circuit, and a conductivity of a material of the second alignment detection pins is greater than a conductivity of a material of the second signal connection pins;
   contacting the substrate with the detection device to electrically connect the first signal connection pins of the substrate with the second signal connection pins of the detection device one by one, and electrically connect one of the first alignment detection pins on each side of the at least one side of the first signal connection pins with at least one of the second alignment detection pin; and before applying a detection signal to the second signal connection pins, inputting an alignment signal to the signal input second alignment detection pins and performing an alignment detection to detect whether the first signal connection pins and the second signal connection pins are aligned accurately, wherein the second alignment detection pins are arranged at an equal spacing and a first spacing is provided between two second alignment detection pins adjacent to each other, and at least one of the first alignment detection pins has a width greater than the first spacing.

10. The alignment detection method according to claim 9, wherein the first signal connection pins are periodically arranged and a second spacing is provided between two first signal connection pins adjacent to each other; the second signal connection pins are periodically arranged and a third spacing is provided between two second signal connection pins adjacent to each other; and the second spacing is equal to the third spacing;

in a case that the first signal connection pins and the second signal connection pins are aligned accurately, a fourth spacing is provided between the first alignment detection pin and the second alignment detection pin which are adjacent to each other;

wherein the fourth spacing is less than or equal to the second spacing.

11. The alignment detection method according to claim 9, wherein a number of the first alignment detection pin on each side of the first signal connection pins in the arrangement direction of the first signal connection pins is 1; wherein according to an arrangement direction of the second alignment detection pins, the second alignment detection pin in the middle is the signal input second alignment detection pin, and the second alignment detection pins on both sides of the second alignment detection pin in the middle are the signal feedback alignment detection pins;

one of the first alignment detection pin is electrically connected to the signal input second alignment detection pin, and no feedback of the alignment detection result signal on the signal feedback alignment detection pins on both sides of the signal input second alignment detection pin; or one of the first alignment detection pin is electrically connected to the signal input second alignment detection pin, and also electrically connected to one of the signal feedback alignment detection pins on both sides of the signal input second alignment detection pin; and one of the signal feedback alignment detection pins on both sides feeds back the alignment detection result signal.

12. The alignment detection method according to claim 11, wherein the alignment detection result signal is an electrical signal.

13. The alignment detection method according to claim 12, wherein the electrical signal is a current.

\* \* \* \* \*